US012775353B2

(12) United States Patent
Luo et al.

(10) Patent No.: US 12,775,353 B2
(45) Date of Patent: Oct. 27, 2026

(54) TOUCH LAYER, TOUCH SUBSTRATE, AND TOUCH DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Chang Luo, Beijing (CN); Yi Zhang, Beijing (CN); Shun Zhang, Beijing (CN); Yang Zeng, Beijing (CN); Yuanqi Zhang, Beijing (CN); Ping Wen, Beijing (CN); Yu Wang, Beijing (CN); Wei Wang, Beijing (CN); Tianci Chen, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/187,535

(22) Filed: Apr. 23, 2025

(65) Prior Publication Data

US 2025/0251823 A1 Aug. 7, 2025

Related U.S. Application Data

(63) Continuation of application No. 18/264,493, filed as application No. PCT/CN2022/119377 on Sep. 16, 2022, now Pat. No. 12,314,508.

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05); *G06F 3/0446* (2019.05); (Continued)

(58) Field of Classification Search
CPC ....... G06F 3/044–0448; G06F 3/04164; G06F 2203/04112; G06F 2203/04111
See application file for complete search history.

(56) References Cited

U.S. PATENT DOCUMENTS

| | | | | |
|---|---|---|---|---|
| 9,959,003 | B2 * | 5/2018 | Lee | G06F 3/045 |
| 10,025,444 | B2 * | 7/2018 | Kikukawa | G06F 3/041 |

(Continued)

*Primary Examiner* — Patrick F Marinelli
(74) *Attorney, Agent, or Firm* — Muncy, Geissler, Olds & Lowe, P.C.

(57) ABSTRACT

A touch layer, a touch substrate and a touch display device are provided. The touch layer includes a first electrode chain formed by at least two first electrodes arranged along a first direction and connected with each other, and a second electrode chain formed by at least two second electrodes arranged along a second direction crossing the first direction and connected in sequence; at least one side edge of the first electrode is provided with a plurality of first fingers, at least one side edge of the second electrode is provided with a plurality of second fingers, the first fingers and the second fingers are mutually embedded; at least one first finger has a smaller extension length than other first finger and is closer to the crossing point; at least one second finger has a smaller extension length than other second finger and is closer to the crossing point.

20 Claims, 14 Drawing Sheets

(52) U.S. Cl.
CPC .. *G06F 3/0448* (2019.05); *G06F 2203/04111* (2013.01); *G06F 2203/04112* (2013.01)

(56) References Cited

U.S. PATENT DOCUMENTS

| | | | | | |
|---|---|---|---|---|---|
| 10,521,048 | B2 * | 12/2019 | Yang | G06F 1/1652 | |
| 10,732,752 | B1 * | 8/2020 | Zhu | G06F 3/0416 | |
| 10,996,804 | B2 * | 5/2021 | Jun | G06F 3/0443 | |
| 11,347,357 | B2 * | 5/2022 | Jun | G06F 3/0443 | |
| 11,460,948 | B2 * | 10/2022 | Han | G06F 3/0446 | |
| 11,579,735 | B2 * | 2/2023 | Ye | G06F 3/0446 | |
| 11,693,522 | B2 * | 7/2023 | Jun | G06F 3/0443 | 345/174 |
| 11,709,566 | B2 * | 7/2023 | Ishizaki | G06F 3/047 | 345/174 |
| 11,805,684 | B2 * | 10/2023 | Jung | G06F 3/04164 | |
| 11,816,283 | B2 * | 11/2023 | Li | G06F 3/04164 | |
| 12,001,640 | B2 * | 6/2024 | Zhang | G06F 3/047 | |
| 12,073,050 | B2 * | 8/2024 | Zhang | G06F 3/0448 | |
| 12,118,163 | B2 * | 10/2024 | Ye | G06F 3/0418 | |
| 12,118,170 | B2 * | 10/2024 | Wang | G06F 3/0446 | |
| 12,216,869 | B2 * | 2/2025 | Qu | G06F 3/0443 | |
| 12,254,144 | B2 * | 3/2025 | Ye | G06F 3/0412 | |
| 2015/0109246 | A1 * | 4/2015 | Lee | G06F 3/045 | 345/174 |
| 2020/0103996 | A1 * | 4/2020 | Katagiri | G03C 1/047 | |
| 2021/0181888 | A1 * | 6/2021 | Yan | G06F 3/0445 | |
| 2021/0296423 | A1 * | 9/2021 | Jung | G06F 3/04164 | |
| 2022/0043532 | A1 * | 2/2022 | Feng | G06F 3/04162 | |
| 2022/0066609 | A1 * | 3/2022 | Han | G06F 3/04164 | |
| 2022/0214768 | A1 * | 7/2022 | Ye | G06F 3/0446 | |
| 2022/0317848 | A1 * | 10/2022 | Li | G06F 3/04164 | |
| 2022/0326833 | A1 * | 10/2022 | Cho | G06F 3/04184 | |
| 2023/0359300 | A1 * | 11/2023 | Liu | G06F 3/0412 | |
| 2023/0376159 | A1 * | 11/2023 | Zhang | G06F 3/0443 | |
| 2024/0074043 | A1 * | 2/2024 | Li | G06F 3/041 | |
| 2024/0155761 | A1 * | 5/2024 | Xiao | G06F 3/041 | |
| 2024/0168585 | A1 * | 5/2024 | Ye | G06F 3/0412 | |
| 2024/0302930 | A1 * | 9/2024 | Wang | G06F 3/0446 | |
| 2024/0319832 | A1 * | 9/2024 | Zeng | G06F 3/0412 | |
| 2024/0338096 | A1 * | 10/2024 | Zheng | G06F 3/0418 | |
| 2024/0393907 | A1 * | 11/2024 | Qu | G06F 3/0446 | |
| 2024/0427451 | A1 * | 12/2024 | Luo | G06F 3/04164 | |

* cited by examiner

TOUCH LAYER, TOUCH SUBSTRATE, AND TOUCH DISPLAY DEVICE

CROSS-REFERENCE TO RELATED APPLICATION

The present application is a continuation application of U.S. patent application Ser. No. 18/264,493 filed on Aug. 7, 2023, which is a U.S. National Phase of International Application No. PCT/CN2022/119377 filed on Sep. 16, 2022. The entire contents of the above-listed application are hereby incorporated by reference for all purposes.

TECHNICAL FIELD

The present disclosure relates to the technical field of displays, and more particularly, to a touch layer, a touch substrate, and a touch display device.

BACKGROUND

OLED (Organic Light Emitting Diode) display devices have become a competitive and promising class of display devices due to a series of advantages, such as all-solid-state structure, self-luminescence, fast response, high brightness, full viewing angle, and flexible display. In the related art, a flexible OLED product may integrate a touch function layer on a display panel. Higher requirements are placed on operational stability and reliability in OLED products.

SUMMARY

The embodiments of the present disclosure provide a touch layer, a touch substrate, and a touch display device, which can improve the touch performance.

The technical solutions provided by the embodiments of the present disclosure are as follows:

In a first aspect, the present disclosure provides a touch layer, a touch pattern of the touch layer comprising:

at least one first electrode chain and at least one second electrode chain, wherein the first electrode chain comprises at least two first electrodes arranged along a first direction and connected with each other, and the second electrode chain comprises at least two second electrodes arranged along a second direction crossing the first direction and connected in sequence, and the first electrode chain and the second electrode chain cross each other and are insulated to form at least one crossing point; wherein at least one side edge of the first electrode is provided with a plurality of first fingers protruding outwards, at least one side edge of the second electrode is provided with a plurality of second fingers protruding outwards, and the plurality of first fingers and the plurality of second fingers are mutually embedded;

in at least one side edge of the first electrode, at least one first finger has a smaller extension length than at least one other first finger and is closer to the crossing point; and/or in at least one side edge of the second electrode, at least one second finger has a smaller extension length than at least one other second finger and is closer to the crossing point.

In some embodiments, in at least one side edge of the first electrode, the first finger has an extension length in a contour extension direction of the side edge that gradually increases from opposite ends of the side edge toward the middle; and/or in at least one side edge of the second electrode, the second finger has an extension length in a contour extension direction of the side edge that gradually increases from opposite ends of the side edge toward the middle.

In some embodiments, one second finger is embedded in a first gap between two adjacent first fingers, and the first gap has the same pattern as the second finger embedded in the first gap; and/or one first finger is embedded in a second gap between two adjacent second fingers, and the second gap has the same pattern as the first finger embedded in the second gap.

In some embodiments, the patterns of at least one group of two first electrodes adjacent in the first direction are in rotational symmetry, with a crossing point formed by the two adjacent first electrodes and the second electrodes as a rotation center; and/or the patterns of at least one group of two second electrodes adjacent in the second direction are in rotational symmetry, with a crossing point formed by the two adjacent second electrodes and the first electrodes as a rotation center.

In some embodiments, the pattern of the first electrode is in mirror symmetry about a mirror axis along the first direction and passing through a crossing point of the first electrode and the second electrode; and/or the pattern of the second electrode is in mirror symmetric about a mirror axis along the second direction and passing through a crossing point of the second electrode and the first electrode.

In some embodiments, the extension lengths of a plurality of first fingers on the same side edge of the first electrode are different; the extension lengths of a plurality of second fingers on the same side edge of the second electrode are different.

In some embodiments, a plurality of first projections and a plurality of first recesses are provided on at least one side edge of the first electrode, the plurality of first projections and the plurality of first recesses are staggered in sequence, and the first projections and the first recesses adjacent thereto are fitted to form the first finger; a plurality of second projections and a plurality of second recesses are provided on at least one side edge of the second electrode, the plurality of second projections and the plurality of second recesses are staggered in sequence, and the second projections and the second recesses adjacent thereto are fitted to form the second finger.

In some embodiments, the first electrode comprises at least a first side edge and a second side edge adjacent to each other, the pattern of the plurality of first projections on the first side edge is the same as the pattern of the plurality of first recesses on the second side edge, and the pattern of the plurality of first recesses on the first side edge is the same as the pattern of the plurality of first projections on the second side edge; the second electrode includes at least a third side edge and a fourth side edge adjacent to each other, the pattern of the plurality of second projections on the third side edge is the same as the pattern of the plurality of second recesses on the fourth side edge, and the pattern of the plurality of second recesses on the third side edge is the same as the pattern of the plurality of second projections on the fourth side edge.

In some embodiments, a plurality of first fingers on the edge of any one of the first electrodes are sequentially ordered from one end to the other end along the contour extension direction of the side edge, and the extension lengths of the first fingers with the same sequence number of the first electrodes on different edges are the same; and/or a plurality of second fingers on the edge of any one of the second electrodes are sequentially ordered from one end to the other end along the contour extension direction of the side edge, and the extension lengths of the second fingers of the same sequence number on different edges are the same.

In some embodiments, the first electrode and the second electrode are both made of a metal mesh, and the first electrode is arranged to cross the second electrode by a breakpoint of the metal mesh and insulated from the second electrode.

In some embodiments, the first electrode chain further comprises at least one first connecting bridge connecting two adjacent first electrodes, and the second electrode chain further comprises at least one second connecting bridge connecting two adjacent second electrodes; wherein the second connecting bridge and the first electrode, the second electrode are the same metal layer, and the second connecting bridge and the first connecting bridge are different metal layers.

In some embodiments, an included angle is formed by an extension direction of the first finger and the contour extension direction of the side edge where the first finger is located; and/or an included angle is formed by the extension direction of the second finger and the contour extension direction of the side edge where the second finger is located.

In some embodiments, the included angle is 90 degrees.

In a second aspect, the present disclosure provides a touch substrate comprising: a substrate and a touch layer as described above.

In some embodiments, the touch substrate comprises a central area and a peripheral area located at the periphery of the central area, at least one side of the peripheral area is a binding side, a driving circuit is provided at the binding side, the touch layer comprises a plurality of touch electrodes and a plurality of touch signal lines, the touch electrodes comprise at least one first electrode and at least one second electrode, and each of the touch signal lines is connected between a corresponding touch electrode and the driving circuit, wherein at least one touch signal line comprises:

a main line led out from the driving circuit and extending to the central area via the binding side in a third direction, the third direction being a direction from the binding side to an opposite side of the binding side; and, at least one branch line connected to one end of the main line away from the driving circuit and extending along at least part of the outer contour of the pattern of the touch electrode connected to the touch signal line and connected to the touch electrode.

In some embodiments, a connection position of the branch line and the main line is at an intermediate position of the branch line in the direction extending along the outer contour of the pattern of the touch electrode, so that the branch line is divided into a first branch section and a second branch section extending away from each other by the connection position.

In some embodiments, at least part of the main line is in a non-wound straight line shape at least at a part in the peripheral area and a part extending from the peripheral area into the central area;

at least another part of the main line comprises:

a first line segment, one end of the first line segment being connected to the driving circuit, and the other end extending in a straight line along the third direction toward the central area;

a second line segment, one end of the second line segment being connected to an end of the first line segment facing away from the driving circuit, the other end extending a predetermined distance along an outer contour of the central area; and a third line segment connected at one end to an end of the second line segment facing away from the second line segment and at the other end to the branch line.

In some embodiments, the branch line is closely attached to at least part of the outer contour of the pattern of the corresponding touch electrode so as to be directly connected to at least part of the outer contour of the pattern of the touch electrode as one body.

In some embodiments, the extension length of the main line of the plurality of the touch signal lines along the third direction is different, and the longer the extension length of the main line of the plurality of the touch signal lines along the third direction is, the shorter the extension length of the branch line along the outer contour of the pattern of the corresponding the touch electrode is.

In some embodiments, along the third direction, a plurality of the touch electrodes are divided into N rows, and the first row of touch electrodes is closer to the binding side than the Nth row of touch electrodes; wherein, from the first row of touch electrodes to the Nth row of touch electrodes, the extension length of the main line in the third direction gradually increases, and the extension length of the branch line along at least part of the outer contour of the pattern of the corresponding touch electrode gradually decreases.

In some embodiments, the touch signal line is further divided into a first portion located in the central area and a second portion located in the peripheral area by a boundary between the peripheral area and the central area, wherein the first portion and the first electrode, the second electrode and the first connecting bridge are the same metal layer, and the second portion is divided into two layers of traces, wherein one layer of traces is the same metal layer as the first electrode, the other layer of traces is the same metal layer as the second connecting bridge, and the two layers of traces in the second portion are connected through a via hole.

In a third aspect, the present disclosure provides a touch display device including the touch substrate as described above.

Advantageous effects brought about by embodiments of the present disclosure are as follows:

With regard to the touch layer, the touch substrate and the touch display device provided by the embodiments of the present disclosure, by optimizing the electrode pattern in the touch layer, a finger pattern is designed at the position where the first electrode and the second electrode cross, and since the space of the electrodes is smaller at the position close to the crossing point, the finger length thereof can be shorter, while the space of the electrodes is larger at the position far away from the crossing point, the length of only this part of the finger can be increased, so that the relative side length between the first electrode and the second electrode can be effectively increased so as to increase the mutual capacitance change value A Cm between the first electrode and the second electrode; the problem that the electrode resistance increases and the touch load increases due to the small internal metal wiring space of the first electrode and the second electrode is not avoided, and the problem that the mutual capacitance value Cm is too large and the value of ΔCm/CM is small and affects the touch chip recognition due to the too long finger is avoided.

DETAILED DESCRIPTION

In order that the objects, technical solutions and advantages of the embodiments of the present disclosure will become more apparent, a more particular description of the embodiments of the present disclosure will be rendered by reference to the appended drawings. It is to be understood that the described embodiments are part, but not all, of the disclosed embodiments. Based on the embodiments described in the present disclosure, all other embodiments obtained by a person of ordinary skill in the art without inventive effort fall within the scope of the present disclosure.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. Likewise, terms such as "a", "an", or "the" do not denote a limitation of quantity, but rather denote the presence of at least one of the referenced item. The terms "comprising" or "comprises", and the like, means that the presence of an element or item preceding the word covers the presence of the element or item listed after the word and equivalents thereof, but does not exclude other elements or items. The terms "connecting" or "connected" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

Figure 1:
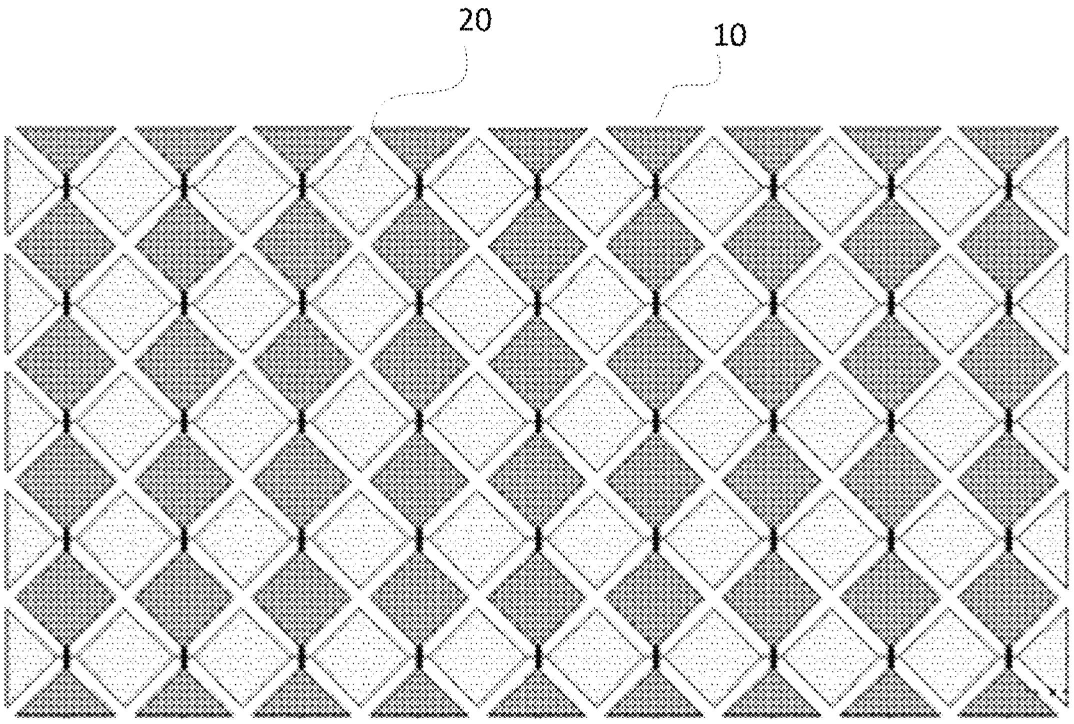
FIG. 1 is a touch pattern diagram in the related art.

Before describing in detail the touch layer, the touch substrate and the touch display device provided by the embodiments of the present disclosure, it is necessary to describe the following related art:

In the related art, in-screen on cell touch of OLED (organic light emitting diode) display devices has been widely used in the industry. With reference to FIG. 1, an on-screen touch display device of a FMLOC (a flexible multi-layer touch structure) has a touch functional unit composed of two metal wire channels crossing each other, namely, a Tx channel and an Rx channel, wherein the Tx channel is composed of a plurality of rows of first electrode chains, each row of first electrode chains comprising a plurality of first electrodes 10 arranged and connected in sequence, and the Rx channel is composed of a plurality of columns of second electrode chains, each column of second electrode chains comprising a plurality of second electrodes 20 arranged and connected in sequence, and whether there is a touch being generated is determined by detecting a mutual capacitance change value ΔCms between the two channels before and after the contact.

Figure 2:
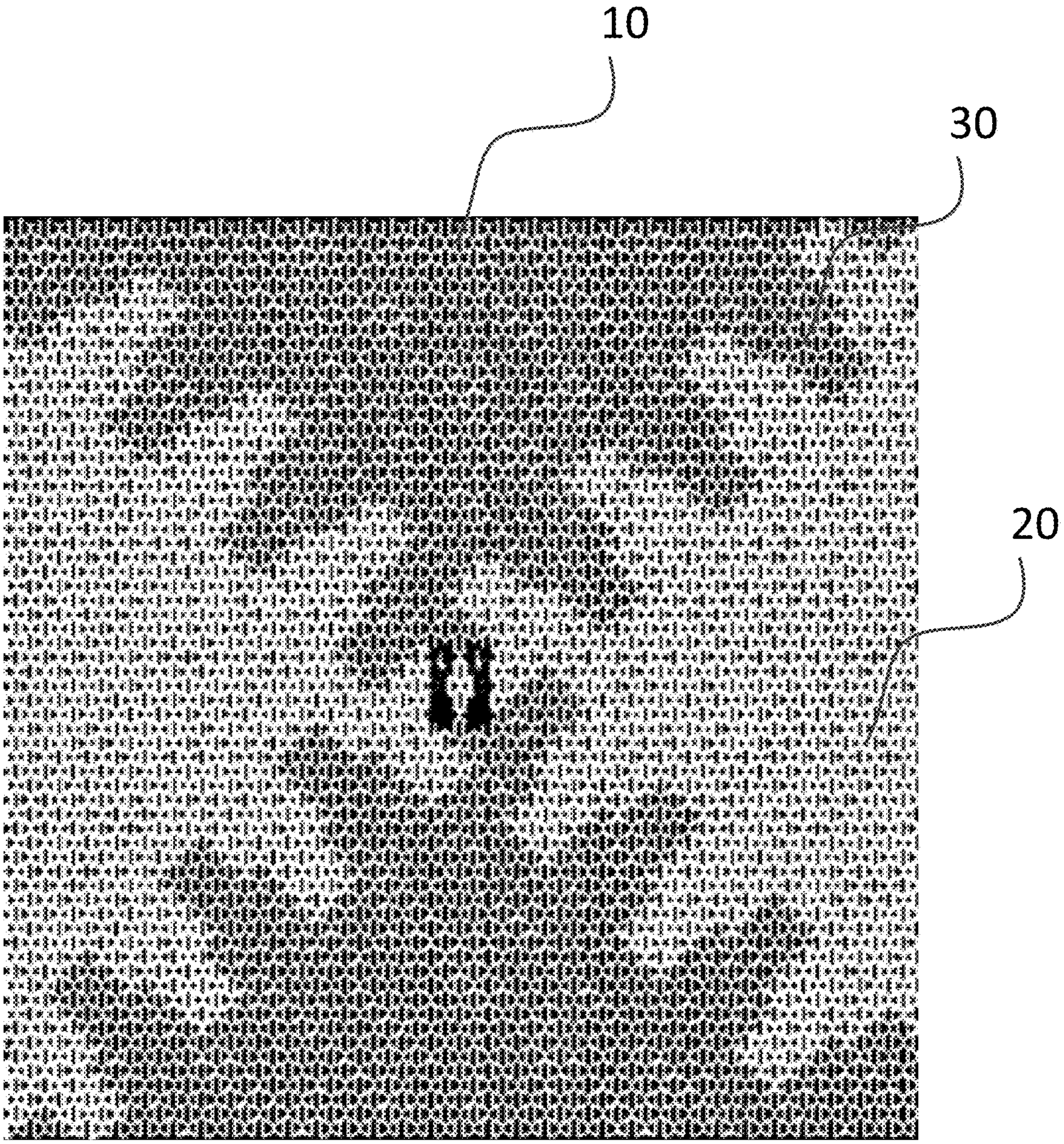
FIG. 2 is a schematic diagram showing a partial structure of a touch pattern at an interface of a first electrode and a second electrode in the related art.

When designing the touch pattern of FMLOC, the mutual capacitance change value ΔCm needs to be large enough to accurately identify the signal change before and after touch and judge whether there is touch. In order to increase the mutual capacitance change value ΔCm, in the related art, as shown in FIG. 2, a plurality of fingers 30 are provided at the crossing point Of the first electrode 10 of the Tx channel and the second electrode 20 of the Rx channel, and by increasing the length of the fingers 30 between the first electrode 10 in the Tx channel and the second electrode 20 in the Rx channel, the intersection area between the Tx channel and the Rx channel is increased, thereby increasing the mutual capacitance value Cm between the fingers, thereby increasing ΔCm.

The inventors of the present disclosure have found that, in the related art, when increasing the finger length, there are mainly the following problems:

1) The electrode is usually formed by a metal grid, and if the length of a finger is too long, the metal wiring space in the electrode may be reduced, leading to an increase in the resistance of the electrode, thus leading to an increase in channel load and affecting the touch characteristic;

2) If the length of the finger is too long, the mutual capacitance value Cm may be too large, so that the ratio ΔCm/CM between the variation value of the mutual capacitance and the mutual capacitance value is small, affecting the touch chip recognition;

3) The increase of finger length may result in the difference of touch pattern size between Tx channel and Rx channel, so that the difference of resistance and self-capacity between Tx channel and Rx channel may affect the touch characteristics.

Figure 3:
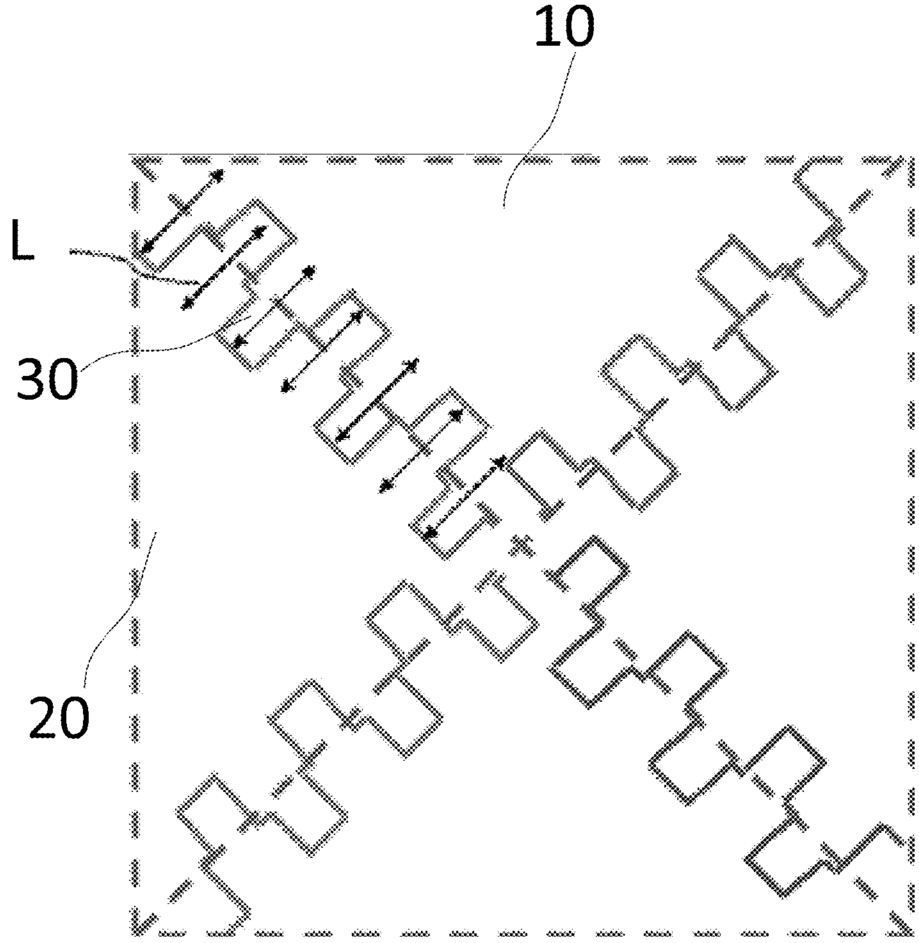
FIG. 3 is a schematic diagram showing a partial structure of a touch pattern in the related art.
Figure 4:
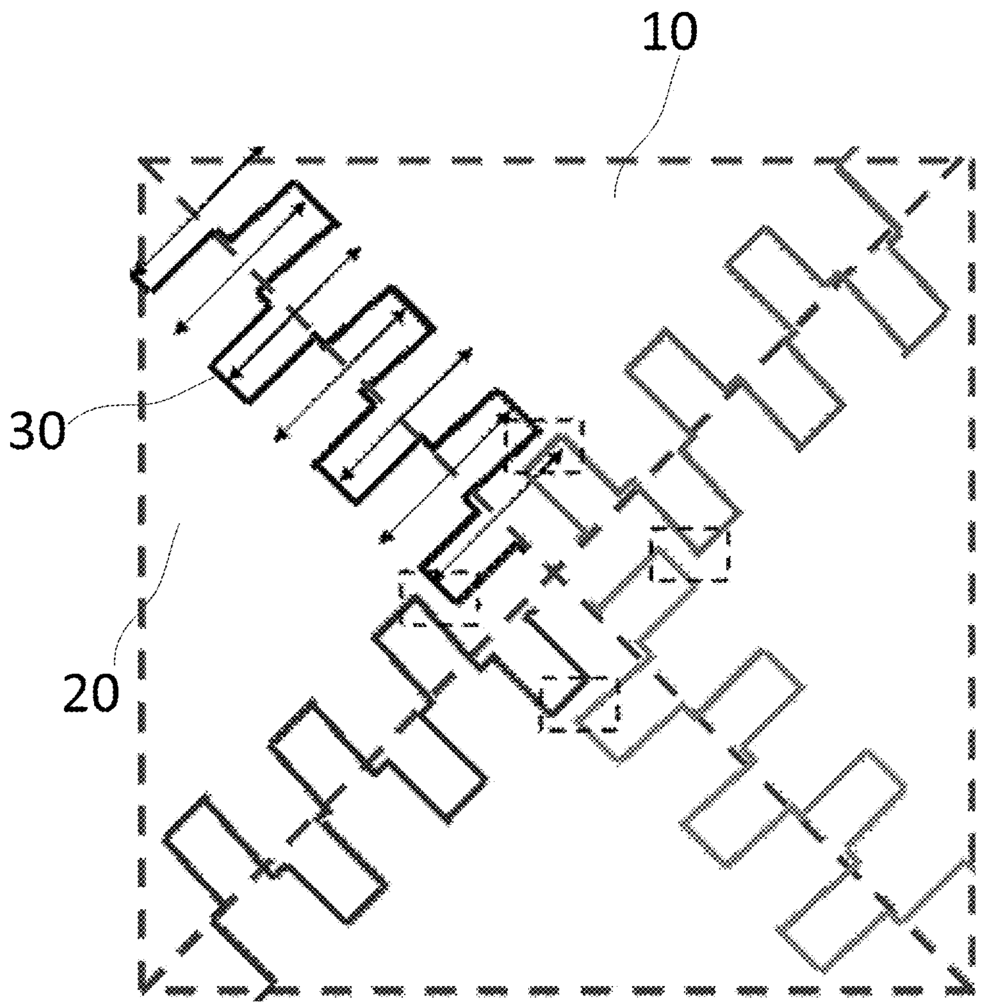
FIG. 4 is a schematic diagram showing a partial structure of another touch pattern in the related art.
Figure 5:
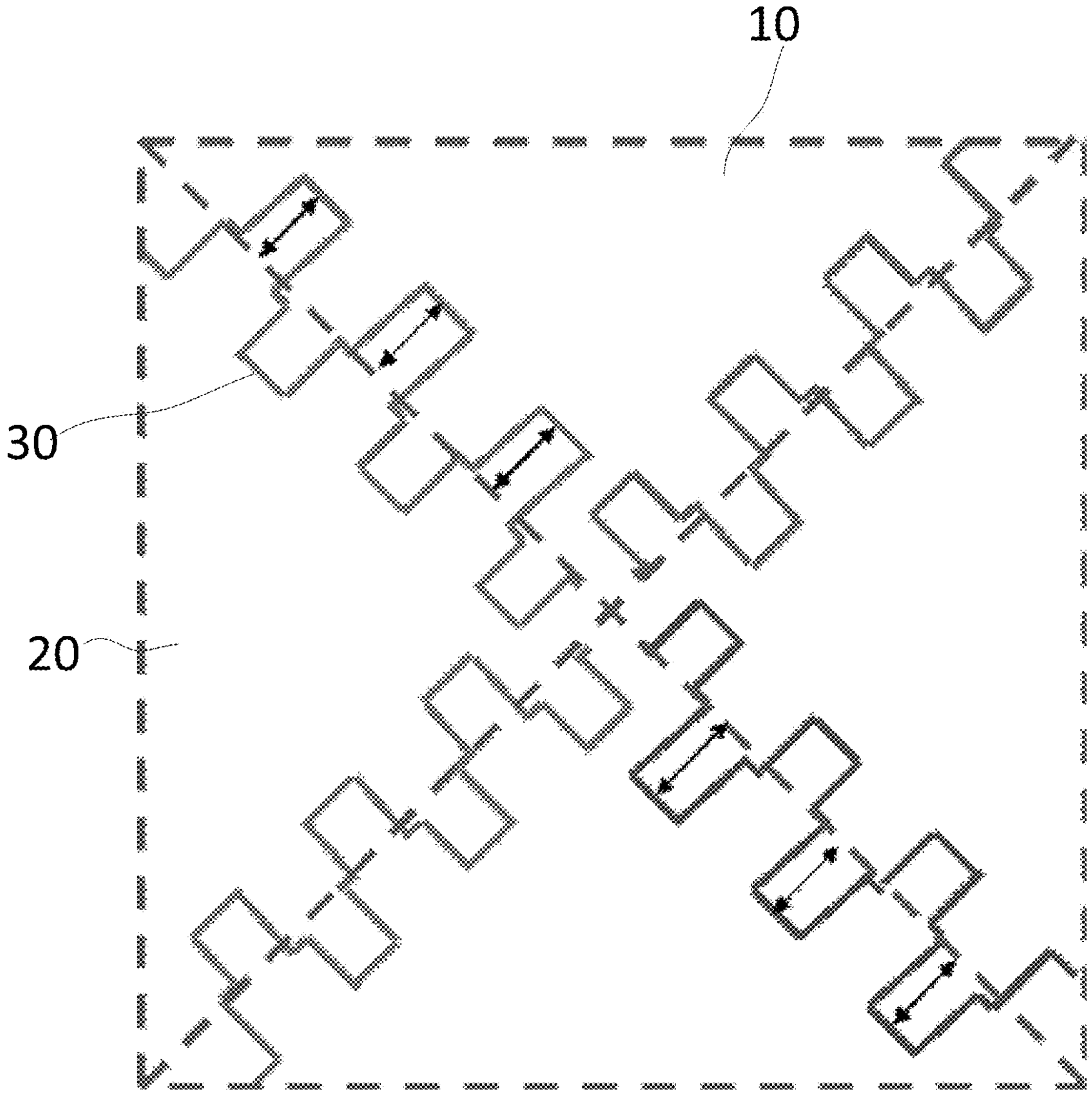
FIG. 5 is a schematic diagram showing a partial structure of another touch pattern in the related art.

Specifically, as shown in FIG. 3, in a touch pattern in the related art, the finger extension length (indicated by L in FIG. 3, namely, the finger extension length) on the first electrode and the second electrode is equal and the finger extension length is short, and at this moment, the value of the mutual capacitance value Cm and the value of the mutual capacitance change value ΔCm is small, which may not accurately identify the signal change before and after the touch; as shown in FIG. 4, in another touch pattern in the related art, when the extension length of all the fingers 30 is increased, a space aisle between the fingers 30 would result in an increase in channel resistance, an excessive mutual capacitance value Cm, and the broken risk would also easily occur in the dotted line frame area in FIG. 4; in another touch pattern of the related art as shown in FIG. 5, the length of only the one-sided partial finger 30 is increased, which results in a difference in the area of the Tx channel and the Rx channel, resulting in a difference in the resistance and the self-capacitance value.

In order to improve the above-mentioned problems in the prior art, the embodiments of the present disclosure provide a touch layer, a touch substrate and a touch display device, which can improve the touch performance.

Figure 6:
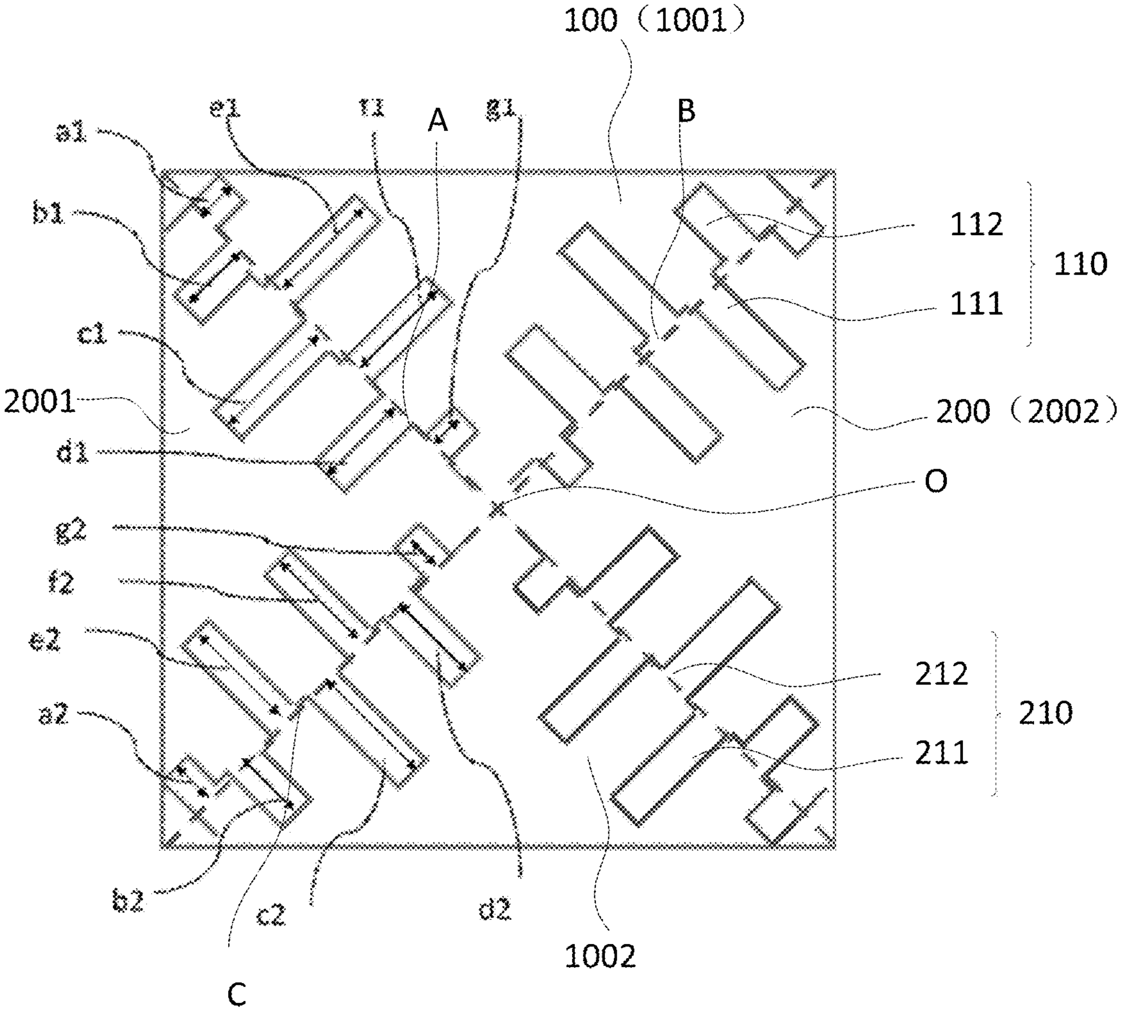
FIG. 6 is a schematic diagram showing a partial structure of a touch pattern of a touch layer provided in some embodiments of the present disclosure.
Figure 7:
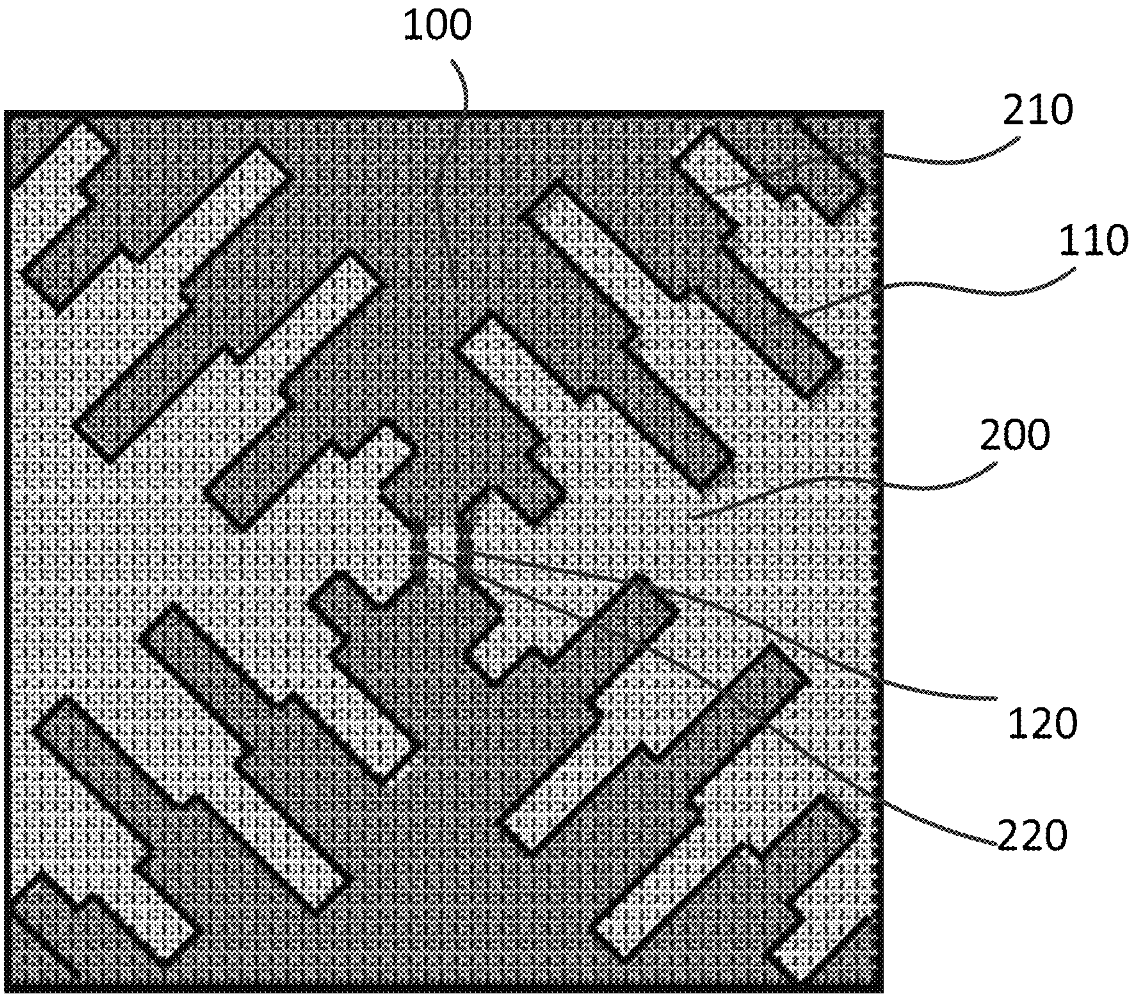
FIG. 7 is a schematic diagram showing a structure of an embodiment when the touch layer shown in FIG. 6 is an FMLOC touch structure.

As shown in FIG. 6, the embodiment of the present disclosure provides a touch layer, wherein the touch pattern of the touch layer comprises: at least one first electrode chain and at least one second electrode chain, wherein the first electrode chain comprises at least two first electrodes 100 arranged along a first direction and connected with each other, and the second electrode chain comprises at least two second electrodes 200 arranged along a second direction crossing the first direction and connected in sequence, and the first electrode chain and the second electrode chain cross each other and are insulated to form at least one crossing point O; wherein at least one side edge of the first electrode 100 is provided with a plurality of first fingers 110 protruding outwards, at least one side edge of the second electrode 200 is provided with a plurality of second fingers 210 protruding outwards, and the plurality of first fingers 110 and the plurality of second fingers 210 are mutually embedded; wherein, in at least one side edge of the first electrode 100, at least one first finger 110 has a smaller extension length than at least one other first finger 110 and is closer to the crossing point O; and/or in at least one side edge of the second electrode 200, at least one second finger 210 has a smaller extension than at least one other second finger 210 and is closer to the crossing point O.

According to the touch layer provided by the embodiments of the present disclosure, by optimizing the electrode pattern in the touch layer, a finger pattern is designed at the position where the first electrode 100 and the second electrode 200 cross, and the position close to the crossing point O can have a shorter finger length due to the smaller space of the electrodes, while the position far away from the crossing point O can have a larger electrode space, and the length of only this part of the finger can be increased, so that the relative side length between the first electrode 100 and the second 1 electrode 200 can be effectively increased to increase the mutual tolerance value ΔCm between the first electrode 100 and the second electrode 200; the problem that the electrode resistance increases and the touch load increases due to the small internal metal wiring space of the first electrode 100 and the second electrode 200 is avoided, and the problem that the mutual capacitance value Cm is too large due to too long fingers and the value of ΔCm/CM is too small to affect the touch chip identification is avoided.

In some embodiments, in at least one side edge of the first electrode 100, the extension length of the first finger 110 gradually increases from the opposite ends of the side edge toward the middle in the contour extension direction of the side edge; in at least one side edge of the second electrode 200, the extension length of the second finger 210 becomes gradually larger from the opposite ends of the side edge toward the middle in the contour extension direction of the side edge.

With the above-mentioned solution, the end portion of the side edge of the first electrode 100 is close to the crossing point O, the inner space of the electrode is smaller as it is closer to the end portion, and the middle of the side edge is far from the crossing point O and the inner space of the electrode is large, so that it can be designed that the length of the finger at the position close to the end portion is small and the length of the finger at the position close to the middle portion is large, and the length of the finger on the second electrode 200 corresponds to the length of the finger on the first electrode 100, in this way, the length of only a part of the finger at the intermediate position of the side edge can be increased, and in this way, it is possible to increase the length of the opposite side between the first electrode 100 and the second electrode 200, namely, increase the cross area of the first electrode 100 and the second electrode 200, so as to improve the mutual capacitance change value ΔCm, and there is no problem of excessive electrode resistance and excessive mutual capacitance value Cm caused by excessive length of each finger as shown in FIG. 1.

Furthermore, by way of example, one second finger is embedded in a first gap between two adjacent first fingers 110, and the pattern of the first gap is the same as that of the second finger 210 embedded in the first gap; one of the first fingers 110 is embedded in a second gap between two adjacent ones of the second fingers 210, and the second gap has the same pattern as the first finger 110 embedded in the second gap. That is, as shown in FIG. 6, the edge shape matching of the first finger 110 on the first electrode 100 and the second finger 210 on the second electrode 200 cross each other to form a complete pattern.

By way of example, a pattern of at least one set of two the first electrodes 100 adjacent in the first direction is rotationally symmetric with the crossing point O formed by the two adjacent first electrodes 100 and the second electrodes 200 as a rotation center; a pattern of at least one group of two of the second electrodes 200 adjacent in the second direction has a rotational symmetry with an crossing point O formed by the adjacent two of the second electrodes 200 and the first electrode 100 as a rotation center.

In the above-mentioned solution, specifically taking the example shown in FIG. 6, two adjacent first electrodes 100 in the first direction are respectively an upper first electrode 1001 and a lower first electrode 1002, a crossing point O is between the upper first electrode 1001 and the lower first electrode 1002, and the pattern obtained by rotating the upper first electrode 1001 180 degrees around the crossing point O completely overlaps with the pattern of the lower first electrode 1002. Similarly, the two second electrodes 200 adjacent in the second direction are a left second electrode 2001 and a right second electrode 2002, respectively, there is an crossing point O between the left second electrode 2001 and the right second electrode 2002, and the pattern obtained by rotating the left second electrode 2001 by 180 degrees around the crossing point O completely coincides with the pattern of the right second electrode 2002.

Figure 8:
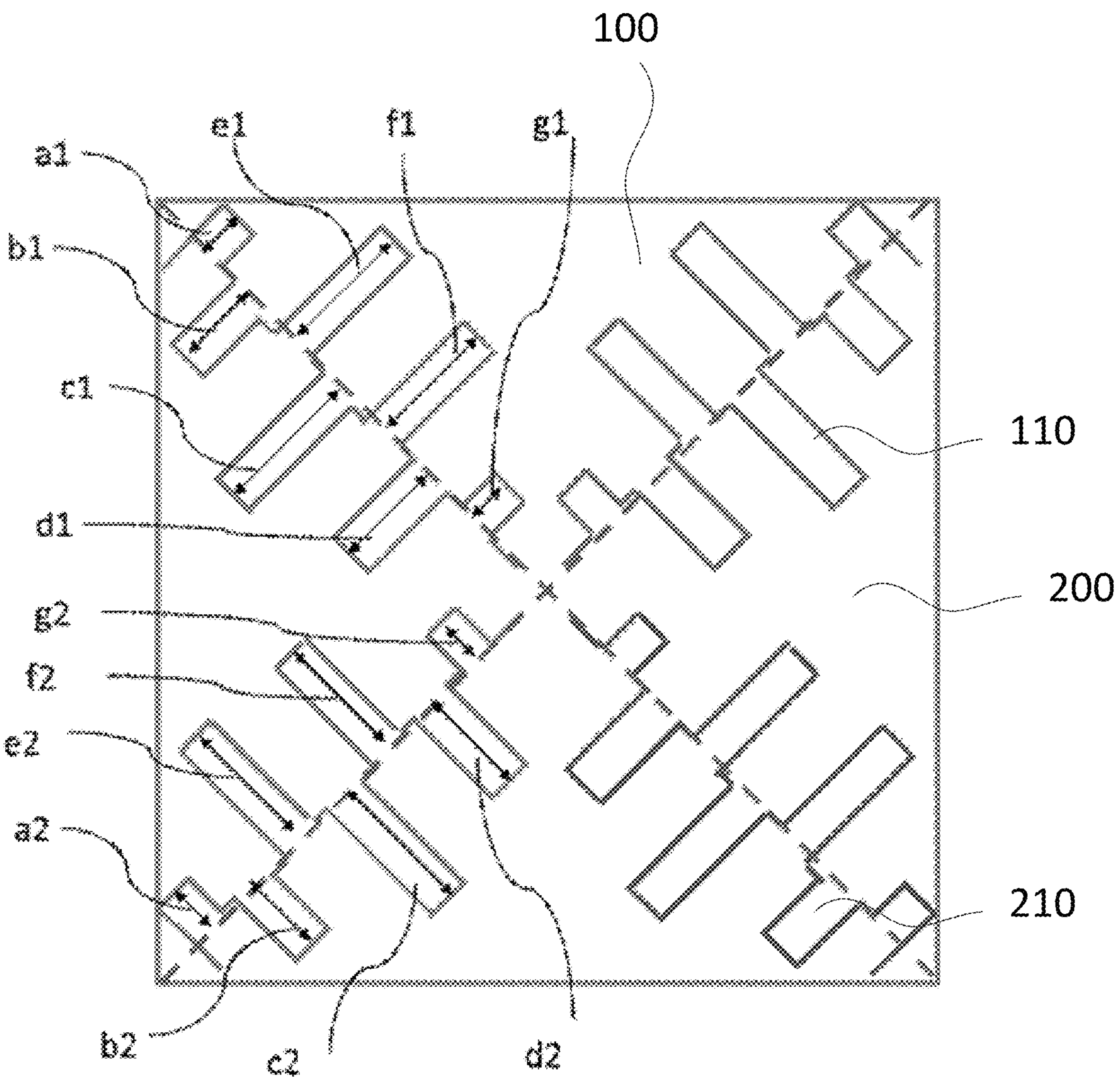
FIG. 8 is a schematic diagram showing a partial structure of a touch pattern of a touch layer provided in further embodiments of the present disclosure.

In other embodiments of the present disclosure, as shown in FIG. 8, the pattern of the first electrode 100 is mirror symmetric about a mirror axis along the first direction and passing through an crossing point O of the first electrode 100 and the second electrode 200; the pattern of the second electrode 200 is mirror-symmetrical about a mirror axis along the second direction and passing through the crossing point O of the second electrode 200 and the first electrode 100.

Furthermore, in some embodiments, as shown in FIG. 6, a plurality of first fingers 110 on the same side edge of the first electrode 100 have different lengths of extension; the extension lengths of the plurality of second fingers 210 on the same side edge of the second electrode 200 are different. Of course in other embodiments not shown, it is also possible that at least part of the first finger 110 on the same side edge of the first electrode 100 has the same extension length and at least part of the first finger 110 has a different extension length.

In addition, in some embodiments, as shown in FIG. 6, characterized in that at least one side edge of the first electrode 100 is provided with a plurality of first projections 111 and a plurality of first recesses 112, the plurality of first projections 111 and the plurality of first recesses 112 are staggered in sequence, and the first projections 111 and the first recesses 112 adjacent thereto are fitted to form the first finger 110; a plurality of second projections 211 and a plurality of second recesses 212 are provided on at least one side edge of the second electrode 200, the plurality of second projections 211 and the plurality of second recesses 212 are staggered in sequence, and the second projections 211 and the second recesses 212 adjacent thereto are fitted to form the second finger 210.

With the above-mentioned solution, the dotted lines A and B in FIG. 6 indicate the extending directions of the two side edges of the first electrode 100, and the first finger 110 is formed by the cooperation of the first projection 111 and the first notch 112 on the side edge of the first electrode 100; accordingly, dotted lines C and A in FIG. 6 indicate the extending directions of both side edges of the second electrode 200, and the second finger 210 is formed by the cooperation of the second projection 211 and the second recess 212 on the side edge of the second electrode 200. With this arrangement, since the first projection 111 and the first recess 112 are provided on the side edge of each of the first electrodes 100, and the second projection 211 and the second recess 212 are provided on the side edge of each of the second electrodes 200, the first projection 111 can be inserted into the second recess 212, and the second projection 211 can be inserted into the first recess 112, whereby when the first electrodes 100 and the second electrodes 200 are inserted into each other, the size of the areas tends to be the same, that is, the difference in the areas of the first electrodes 100 and the second electrodes 200 is smaller, and thus the resistance and self-capacity values of the Tx channel and the Rx channel are closer. It is of course understood that in practical applications, the specific shapes of the first finger 110 and the second finger 210 are not limited to this, and for example, only a projection may be provided on the side edge of the first electrode 100 and only a recess may be provided on the side edge of the second electrode 200.

Furthermore, as an exemplary embodiment, as shown in FIG. 6, the first electrode 100 includes at least a first side edge (a position shown by a dotted line A in the figure) and a second side edge (a position shown by a dotted line B in the figure) adjacent to each other, the pattern of the first plurality of protrusions 111 on the first side edge is the same as the pattern of the plurality of first recesses 112 on the second side edge B, and the pattern of the plurality of first recesses 112 on the first side edge is the same as the pattern of the first plurality of protrusions 111 on the second side edge B; accordingly, the second electrode 200 includes at least a third side edge (a position shown by a dotted line A in the figure) and a fourth side edge (a position shown by a dotted line C in the figure) adjacent to each other, and the pattern of the second projections 211 on the third side edge is the same as the pattern of the second recesses 212 on the fourth side edge, and the pattern of the second recesses 212 on the third side edge is the same as the pattern of the second projections 211 on the fourth side edge.

With regard to the above-mentioned solution, taking the embodiment shown in FIG. 6 as an example, the plurality of first projections 111 on the first side edge of the first electrode 100 are sequentially a1, b1 and c1, the plurality of first recesses 112 are sequentially e1, f1 and g1, the plurality of second projections 211 on the third side edge of the second electrode 200 are sequentially a2, b2 and c2, and the plurality of first recesses 112 are sequentially e2, f2 and g2, wherein the extension lengths of a1, b1, c1, e1, f1 and g1 can be different from each other, and the extension length of a1 is the same as the extension length of a2; the extension length of b1 is the same as the extension length of b2, the extension length of c1 is the same as the extension length of c2, the extension length of d1 is the same as the extension length of d2, the extension length of e1 is the same as the extension length of e2, the extension length of f1 is the same as the extension length of f2, and the extension length of g1 is the same as the extension length of g2. At this time, two adjacent first electrodes 100 in the chain of first electrodes 100 have rotational symmetry, and two adjacent second electrodes 200 in the chain of second electrodes 200 have rotational symmetry. Thus, there is almost no difference in the area of the first electrode 100 and the second electrode 200, and it is possible to ensure that the resistance and self-capacitance values of the Tx channel and the Rx channel are closer.

In addition, taking the example shown in FIG. 8, the plurality of first projections 111 on the first side edge of the first electrode 100 are sequentially a1, b1 and c1, the plurality of first recesses 112 are sequentially e1, f1 and g1, the plurality of second projections 211 on the third side edge of the second electrode 200 are sequentially a2, b2 and c2, and the plurality of first recesses 112 are sequentially e2, f2 and g2, wherein the extension lengths of a1, b1, c1, e1, f1 and g1 can be different from each other, and the extension length of a1 is the same as the extension length of a2; the extension length of b1 is the same as the extension length of b2, the extension length of c1 is the same as the extension length of c2, the extension length of d1 is the same as the extension length of d2, the extension length of e1 is the same as the extension length of e2, the extension length of f1 is the same as the extension length of f2, and the extension length of g1 is the same as the extension length of g2. At this time, the pattern of the first electrode 100 is in mirror symmetry about a mirror axis along the first direction and passing through a crossing point O of the first electrode 100 and the second electrode 200; and/or the pattern of the second electrode 200 is mirror symmetric about a mirror axis along the second direction and passing through a crossing point O of the second electrode 200 and the first electrode 100.

It is of course understood that the above is only an example, and in practical applications, the specific shapes of the first finger 110 and the second finger 210 are not limited thereto.

In addition, a plurality of first fingers 110 on the edge of any one of the first electrodes 100 are sequentially ordered from one end to the other end along the contour extension direction of the side edge, and the extension lengths of the first fingers 110 with the same sequence number on different edges of the first electrodes 100 are the same; the plurality of second fingers 210 on the edge of any one of the second electrodes 200 are sequentially ordered from one end to the other along the contour extension direction of the side edge, and the extension length of the second fingers 210 of the same sequence number on different edges is the same. For example, in the embodiment shown in the figure, the extension length of a1 is equal to the extension length of a2, the extension length of b1 is the same as the extension length of b2, the extension length of c1 is the same as the extension length of c2, the extension length of d1 is the same as the extension length of d2, the extension length of e1 is the same as the extension length of e2, the extension length of f1 is the same as the extension length of f2, and the extension length of g1 is the same as the extension length of g2. Such an arrangement can ensure that the relative side lengths between the first electrode 100 and the second electrode 200 are the same in any area, namely, the relative side lengths between the first electrode 100 and the second electrode 200 represent the area directly opposite to the first electrode 100 and the second electrode 200, which is more advantageous for ensuring the sensitivity of touch operation in each area.

Further, as an exemplary embodiment, the first electrode 100 and the second electrode 200 are each composed of a metal mesh, and the first electrode 100 is insulated from and crossed with the second electrode 200 by a breakpoint of the metal mesh. With the above-described scheme, the boundary between the first electrode 100 and the second electrode 200 insulates the first finger 110 and the second finger 210 through the breakpoint of the metal mesh.

By way of example, the first electrode chain further comprises at least one first connecting bridge 120 connecting two adjacent first electrodes 100, and the second electrode chain further comprises at least one second connecting bridge 220 connecting two adjacent second electrodes 200; wherein the second connecting bridge 220 and the first electrode 100 and the second electrode 200 are the same metal layer, and the second connecting bridge 220 and the first connecting bridge 120 are different metal layers.

In the above solution, the touch layer can be applied to a FMLOC touch structure product, and in other embodiments, the specific structure of the first electrode 100 and the second electrode 200 is not limited thereto.

Furthermore, by way of example, an included angle is formed by the extension direction of the first finger 110 and the contour extension direction of the side edge on which it is located; an included angle is formed by the direction of extension of the second finger 210 and the direction of extension of the contour of the side edge on which it is located. In some embodiments, the included angle is 90 degrees. Of course, the value of the included angle is not limited thereto.

It should be noted that, taking the above-mentioned touch layer being a flexible multi-layer on-screen touch structure (FMLOC) as an example, the exemplary description of the touch substrate provided in the embodiments of the present disclosure is as follows: in other embodiments which are not illustrated, the touch layer may also be a flexible single-layer on-screen touch structure (FSLOC); when the touch layer is a flexible single-layer on-screen touch structure (FSLOC), the film layer structure of the touch functional layer comprises a touch electrode layer, and the touch pattern on the touch electrode layer comprises a plurality of touch electrodes distributed in an array and touch signal lines connected to the plurality of touch electrodes. The detailed structure will not be described again here.

In addition, the embodiments of the present disclosure also provide a touch substrate comprising: the substrate 300 and the touch layer 400 provided by embodiments of the present disclosure are located on the substrate 300. It is obvious that the touch substrate provided by the embodiments of the present disclosure can also bring about the advantageous effects that can be brought about by the touch layer 400 provided by the embodiments of the present disclosure, which will not be described in detail herein.

The touch substrate comprises a central area AA and a peripheral area located at the periphery of the central area AA, at least one side of the peripheral area is a binding side, and a driving circuit (IC) is provided on the binding side; the touch layer 400 comprises a plurality of touch electrodes 410 and a plurality of touch signal lines 420, the touch electrodes 410 comprise at least one first electrode 100 and at least one second electrode 200, and each the touch signal line 420 is connected between a corresponding touch electrode 410 and the driving circuit IC.

Figure 9:
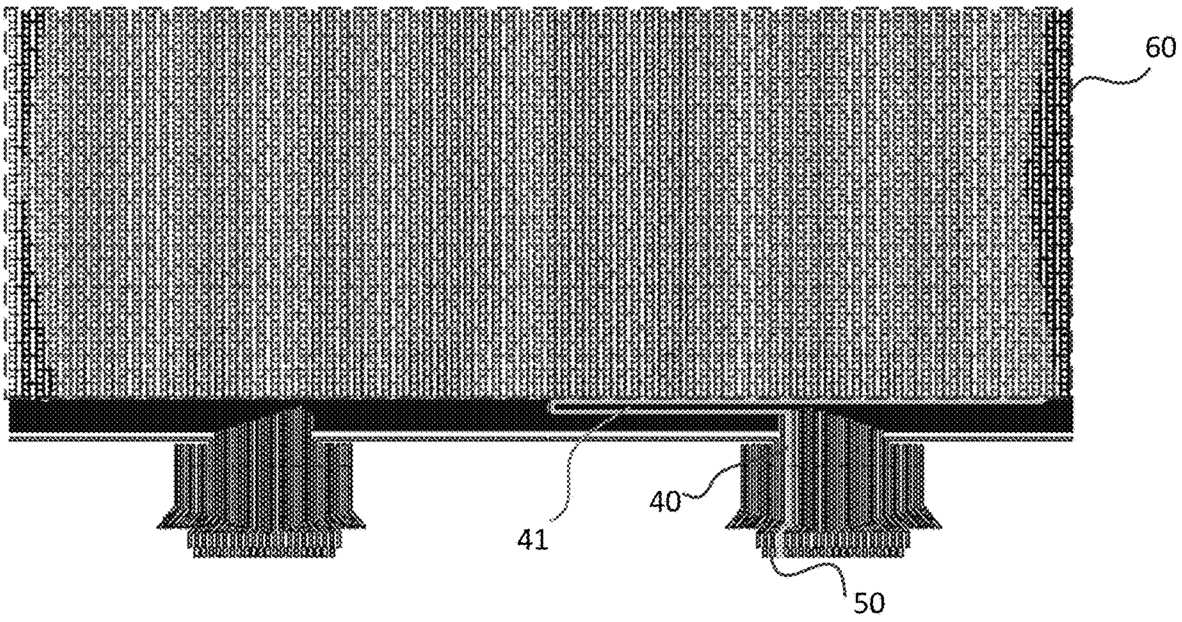
FIG. 9 shows a front view of a touch substrate in the related art.

In the relevant art, when a touch signal line enters a binding side, since different touch signal lines are correspondingly connected to different touch electrodes, and the touch electrodes are divided into multiple rows from a proximal end (namely, one end close to the binding side) to a distal end (namely, one end away from the binding side), the lengths of the different touch signal lines from the touch electrodes to a driving circuit are different, which may result in touch load differences and affect the touch performance. Therefore, in some relevant technologies, as shown in FIG. 9, when some touch signal lines 40 access the central area 60 from the binding side 50, there is a winding design (an area shown as 41 in the figure), and the length difference of different touch signal lines 40 can be compensated by the winding design; however, since the winding position space is too small, static electricity often occurs on the mask plate; therefore, in the design, according to the design requirements, when the touch signal lines 40 access the central area 60, the spacing between some adjacent touch signal lines 40 needs to be greater than 4 microns. This further causes the touch signal line 40 to occupy a large wiring space in the peripheral area, which is disadvantageous for realizing a narrow frame design.

Figure 10:
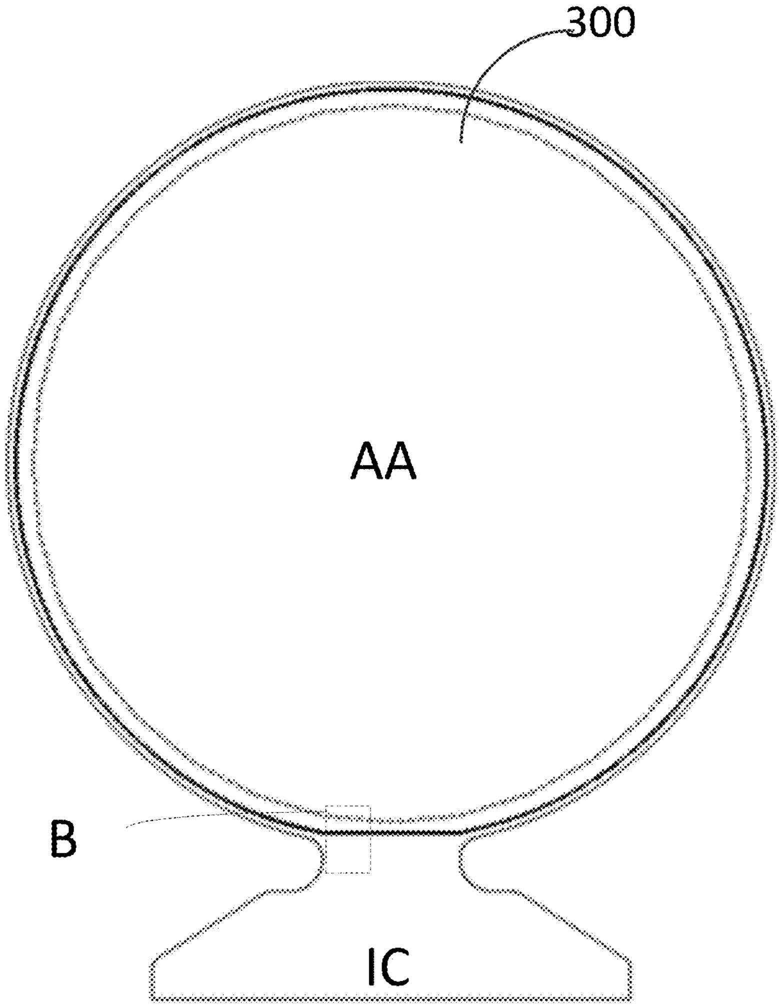
FIG. 10 shows a front view of a touch substrate provided in some embodiments of the present disclosure, in which specific structures such as a touch pattern and a touch signal line are not illustrated.
Figure 11:
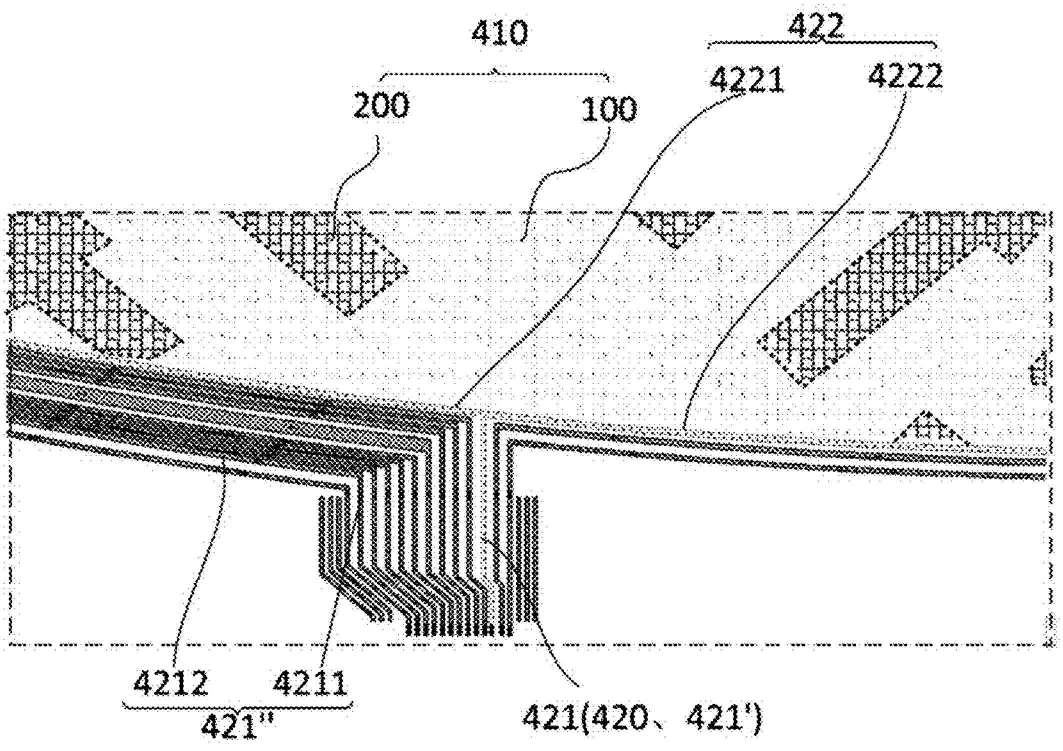
FIG. 11 shows a wiring diagram of part B in FIG. 10.
Figure 12:
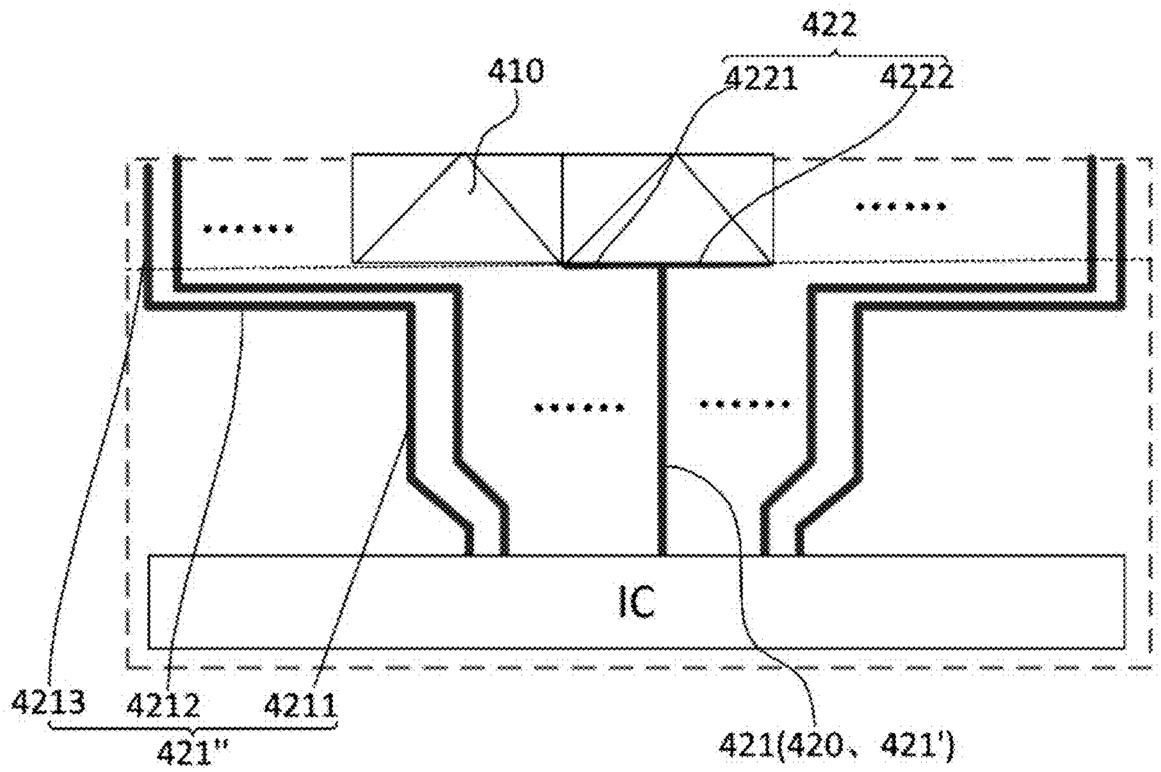
FIG. 12 is a partial schematic diagram showing the wiring of a touch signal line on the binding side.

In order to solve the above problems, in the embodiment of the present disclosure, as shown in FIGS. 10 and 11, at least one touch signal line 420 includes: A main line 421 and at least one branch line 422, the main line 421 leading out from the driving circuit and extending to the middle area AA via the binding side in a third direction, the third direction being a direction from the binding side to an opposite side of the binding side; the branch line 422 is connected to one end of the main line 421 away from the driver circuit (IC), and extends along at least part of the outer contour of the pattern of the touch electrode 410 connected to the touch signal line 420 and is connected to the touch electrode 410.

With the above-mentioned solution, the touch signal line 420 connected to the central area is branched into at least one branch line 422, and the branch line 422 can extend a certain distance along the outer contour of the image of the touch electrode 410 connected thereto, so that the length difference between different touch signal lines 420 can be compensated by the extension length of the branch line 422, so that a winding design can be unnecessary in the peripheral area, and the wiring space of the touch signal line 420 in the peripheral area can be effectively reduced, thereby facilitating the realization of a narrow frame design.

In some exemplary embodiments, as shown in FIG. 11, a connection position of the branch line 422 and the main line 421 is at an intermediate position of the branch line 422 in the direction extending along the outer contour of the pattern of the touch electrode 410, so that the branch line 422 is divided into a first branch section 4221 and a second branch section 4222 extending away from each other by the connection position.

With the above-mentioned scheme, the branch line 422 is divided into two branch sections on the left and right in the direction shown in FIG. 11, namely, a first branch section 4221 and a second branch section 4222, which better meets the wiring space requirements in some touch substrates. It is of course understood that the branch line 422 may also be divided into two branch sections, the ends of which are directly connected to the main line 421.

Further, in some exemplary embodiments, as shown in FIG. 11, at least a portion of the main line 421 (labeled 421' in the figure) is linear in a non-wound design at least at a portion of the peripheral area and a portion extending from the peripheral area into the central area. At least another part of the main line 421 (reference numeral 421" in the figure) comprises: a first line segment 4211, a second line segment 4212 and a third line segment 4213, wherein one end of the first line segment 4211 is connected to the driving circuit, and the other end extends in a straight line along the third direction towards the central area; one end of the second line segment 4212 is connected to an end of the first line segment 4211 facing away from the driving circuit, the other end extending a predetermined distance along the outer contour of the central area; one end of the third line segment 4213 is connected to an end of the second line segment 4212 facing away from the second line segment 4212, and the other end is connected to the branch line 422.

Using the above-mentioned solution, taking an FMLOC touch substrate as an example, along the third direction, a plurality of the touch electrodes 410 are divided into N rows, and the first row of touch electrodes 410 is closer to the binding side than the Nth row of touch electrodes 410, wherein main lines 421 of touch signal lines 420 corresponding to at least some of the touch electrodes 410 in one row of touch electrodes 410 can be directly accessed from the binding side to a central area in a straight line shape, while touch signal lines 420 corresponding to other rows of touch electrodes 410 are accessed from the binding side to a peripheral area at least partly; after extending a distance in parallel along the outer contour of the peripheral area, it is accessed into a corresponding touch electrode 410. What is shown in the figure is a wiring scheme of a FMLOC touch structure, and the number of contact control signal wiring thereof is relatively small, and the contact control signal wiring thereof can respectively extend in the left and right frame directions via a peripheral area after being led out from a binding circuit.

Further, in some embodiments, as shown in FIG. 11, the branch line 422 abuts against at least part of the outer contour of the pattern of the corresponding touch electrode 410 so as to be directly connected with at least part of the outer contour of the pattern of the touch electrode 410. That is to say, the connection area between the branch line 422 and the touch electrode 410 is the whole branch line 422, so that the resistance of the touch signal line 420 can be reduced to a certain extent to satisfy the requirement of low power consumption. It is, of course, understood that the branch line 422 may also be connected only partially, i.e. point-connected, to the corresponding touch electrode 410.

In addition, since the length of the branch line 422 is used to compensate for the difference in the length of the main line 421 on different touch signal lines 420, the extension length of the main line 421 in the plurality of touch signal lines 420 in the third direction is different, and the longer the extension length of the main line 421 in the plurality of touch signal lines 420 in the third direction is, the shorter the extension length of the branch line 422 against the outer contour of the pattern of the corresponding touch electrode 410 is.

In addition, as an exemplary embodiment, along the third direction, a plurality of the touch electrodes 410 are divided into N rows, and the first row of touch electrodes 410 is closer to the binding side than the Nth row of touch electrodes 410; wherein, from the first row of touch electrodes 410 to the Nth row of touch electrodes 410, the extension length of the main line 421 in the third direction gradually increases, and the extension length of the branch line 422 along at least part of the outer contour of the pattern of the corresponding touch electrode 410 gradually decreases.

In addition, when the touch layer 400 is a FMLOC touch structure, the touch signal line 420 further comprises a boundary between the peripheral area and the central area being divided into a first portion located in the central area and a second portion located in the peripheral area, wherein the first portion is the same metal layer as the first electrode 100, the second electrode 200 and the first connecting bridge, and the second portion is divided into two layers of traces, wherein one layer of traces is the same metal layer as the first electrode 100, and the other layer of traces is the same metal layer as the second connecting bridge. And the two layers of traces in the second portion are connected through a via hole (a transition hole).

The touch substrate provided by the embodiments of the present disclosure may further comprise a display functional layer, wherein the display functional layer is used for realizing a display function; a middle area AA is a display area, and a plurality of sub-pixels can be comprised in the display area; the sub-pixels comprise a sub-pixel driving circuit and a light-emitting element which are coupled; and the sub-pixel driving circuit is used for providing a driving signal for the light-emitting element so as to drive the light-emitting element to emit light and realize the display function of the display substrate.

Figure 13:
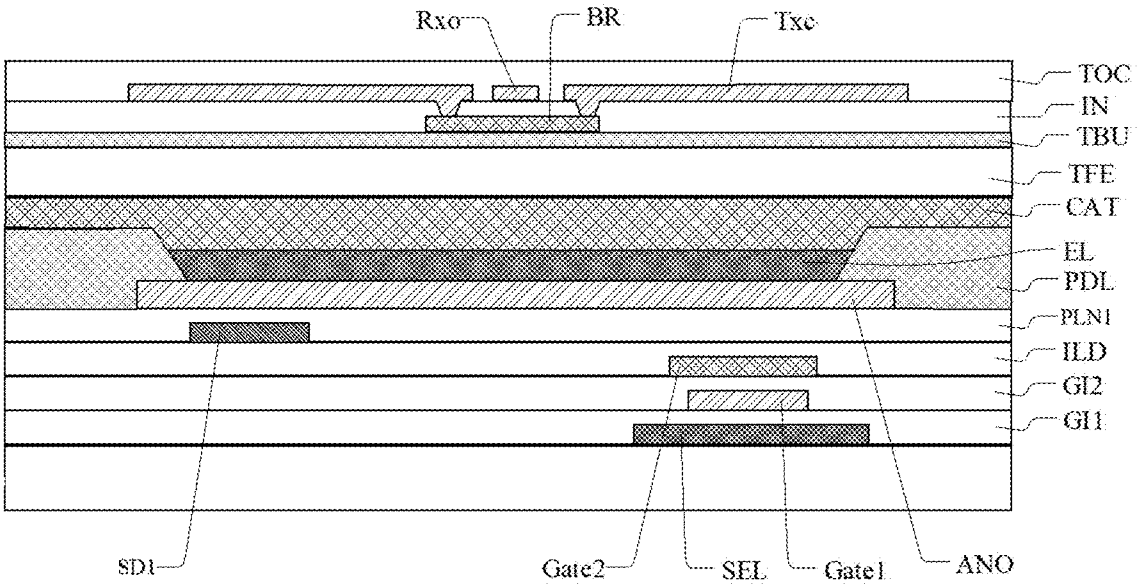
FIG. 13 shows a first cross-sectional view of a touch substrate provided by an embodiment of the present disclosure.

As shown in FIG. 13, for example, the film layer stack structure of the display function layer may comprise a light shielding metal layer SEL, a first insulating layer (not shown in the figure), an active layer (not shown in the figure), a first gate electrode insulating layer GI1, a first gate metal layer Gate1, a second gate electrode insulating layer GI2, a second gate metal layer Gate2, an interlayer insulating layer ILD, a first source and drain metal layer SD1, a first flat layer PLN1, an anode layer ANO, a pixel definition layer PDL, a light emitting function layer EL, a cathode layer CAT, and an encapsulation layer TFE which are arranged in a stack. A film layer stack structure of the touch layer may comprise an inorganic layer TBU, a second metal layer (used for forming an electrode connecting bridge BR), a second insulation layer IN, and a first metal layer (used for forming a touch electrode; Rxo, Txc), a third planarization layer TOC.

Figure 14:
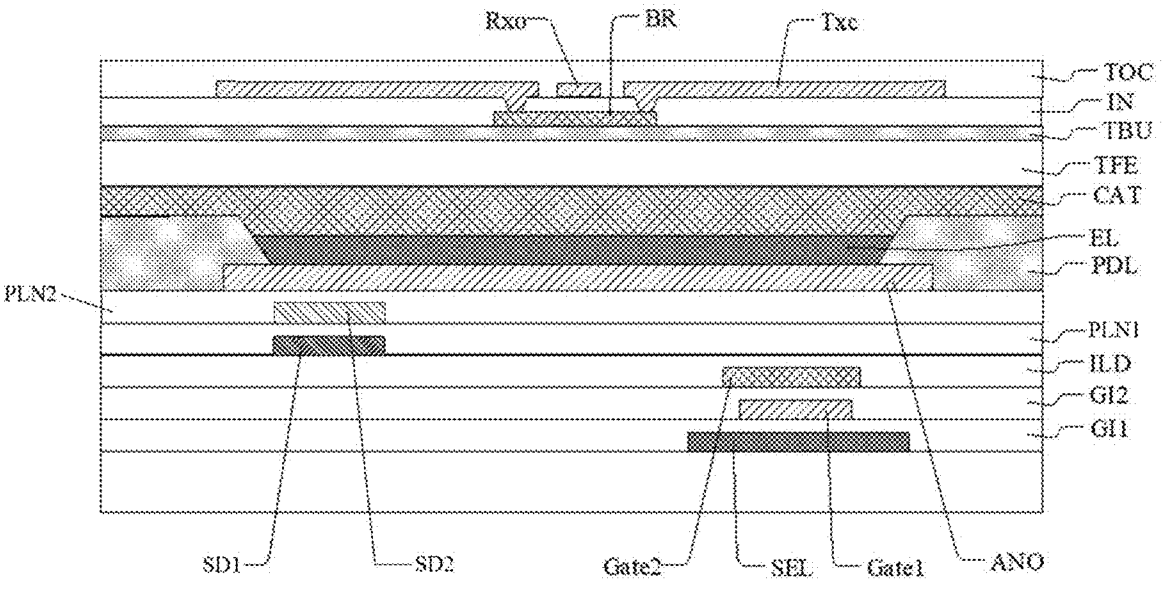
FIG. 14 shows a second cross-sectional view of a touch substrate provided by an embodiment of the present disclosure.

As shown in FIG. 14, the display functional layer may also adopt a double-layer source and drain metal layer structure, namely, the display structure part comprises a light shielding metal layer SEL, a first insulating layer (not shown in the figure), an active layer (not shown in the figure), a first gate electrode insulating layer GI1, a first gate metal layer Gate1, a second gate electrode insulating layer GI2, a second gate metal layer Gate2, an interlayer insulating layer ILD, a first source and drain metal layer SD1, a first flat layer PLN1, a second source and drain metal layer SD2, a second flat layer PLN2, an anode layer ANO, a pixel definition layer PDL, a light emitting functional layer EL, a cathode layer CAT and an encapsulation layer TFE which are arranged in a stacked manner. The touch structure part comprises an inorganic layer TBU, a second metal layer (used for forming an electrode connecting bridge BR), a second insulation layer IN and a first metal layer (used for forming a touch electrode; Rxo, Txc), a third planarization layer TOC.

The sub-pixel driving circuit may adopt LTPS and LTPO modes, which are exemplarily described below.

Figure 15:
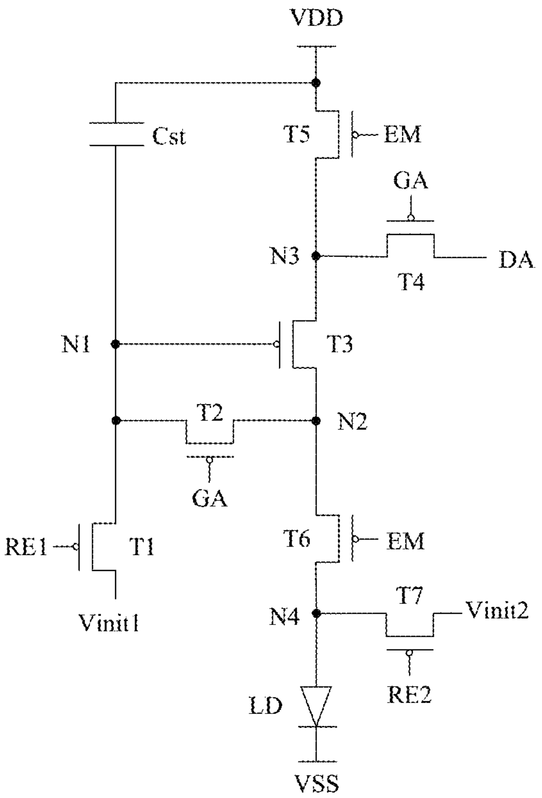
FIG. 15 is a schematic circuit structure diagram of a sub-pixel driving circuit in a LTPS mode in a touch substrate provided by an embodiment of the present disclosure.

As shown in FIG. 15, the sub-pixel driving circuit adopts the LTPS mode.

The sub-pixel driving circuit comprises: a first transistor T1, a second transistor T2, a third transistor 3, a fourth transistor T4, a fifth transistor T5, a sixth transistor T6, a seventh transistor T7 and a storage capacitor Cst.

The display substrate comprises a power supply line VDD, a data line DA, a gate line GA, a light-emitting control line EM, a first reset line RE1, a second reset line RE2, a first initialization signal line Vinit1 and a second initialization signal line Vinit2.

A gate electrode of the first transistor T1 is coupled to a corresponding first reset line RE1, a first electrode of the first transistor T1 is coupled to a corresponding the first initialization signal line Vinit1, and a second electrode of the first transistor T1 is coupled to a gate electrode (namely, a first node N1) of the third transistor T3. A gate electrode of the third transistor T3 is multiplexed as a first plate of a storage capacitor Cst, and a second plate of the storage capacitor Cst is coupled to a power supply line VDD.

The gate electrode of the second transistor T2 is coupled to a corresponding gate line GA, a first electrode of the second transistor T2 is coupled to a second electrode (namely, a second node N2) of the third transistor T3 (namely, a driving transistor), and a second electrode of the second transistor T2 is coupled to a gate electrode of the third transistor T3.

A gate electrode of the fourth transistor T4 is coupled to a corresponding gate line GA, a first electrode of the fourth transistor T4 is coupled to a corresponding data line DA, and a second electrode of the fourth transistor T4 is coupled to a first electrode (namely, a third node N3) of the third transistor T3.

A gate electrode of the fifth transistor T5 is coupled to a corresponding light-emitting control line EM, a first electrode of the fifth transistor T5 is coupled to a power supply line VDD, and a second electrode of the fifth transistor T5 is coupled to a first electrode of the third transistor T3.

A gate electrode of the sixth transistor T6 is coupled to a corresponding light-emitting control line EM, a first electrode of the sixth transistor T6 is coupled to a second electrode of the third transistor T3, and a second electrode of the sixth transistor T6 is coupled to an anode (namely, a fourth node N4) of the light-emitting element LD.

A gate electrode of the seventh transistor T7 is coupled to a second reset line RE2, a first electrode of the seventh transistor T7 is coupled to the second initialization signal line Vinit2, a second electrode of the seventh transistor T7 is coupled to an anode of the light-emitting element LD, and a cathode of the light-emitting element LD receives a negative power supply signal VSS.

Figure 17:
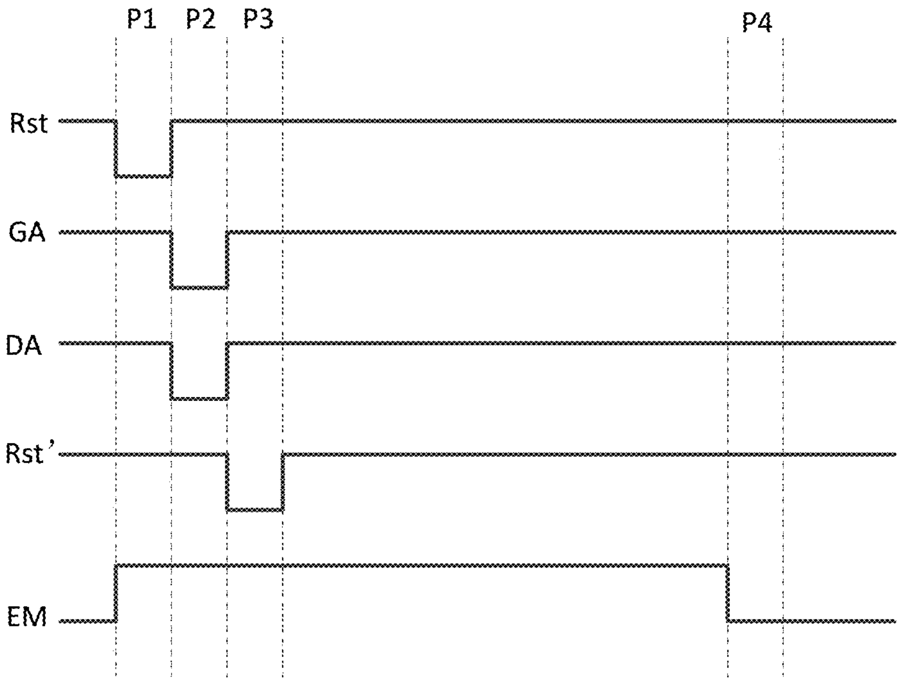
FIG. 17 is a driving timing diagram of an LTPS mode in a touch substrate according to an embodiment of the present disclosure.

As shown in FIG. 17, when the sub-pixel driving circuit of the above-mentioned structure is operated, each operation cycle comprises a first reset period P1, a write compensation period P2, a second reset period P3 and a light-emitting period P4.

In the first reset period P1, the reset signal input by the first reset line RE1 is at an active level, the first transistor T1 is turned on, and the first initialization signal transmitted by the first initialization signal line Vinit1 is input to the gate electrode of the third transistor T3, so that the gate-source voltage Vgs held on the third transistor T3 in the previous frame is cleared to zero, thereby resetting the gate electrode of the third transistor T3.

During a write compensation period P2, the reset signal is at a non-active level, the first transistor T1 is turned off, a gate electrode scanning signal input by the gate line GA is at an active level, the second transistor T2 and the fourth transistor T4 are controlled to be turned on, the data line DA writes a data signal and is transmitted to a first electrode of the third transistor T3 via the fourth transistor T4, at the same time, the second transistor T2 and the fourth transistor T4 are turned on, so that the third transistor T3 is formed as a diode structure, thus passing through the second transistor T2; the third transistor T3 and the fourth transistor T4 are fitted to realize threshold voltage compensation for the third transistor T3, and when the compensation time is long enough, the potential of the gate electrode of the third transistor T3 can be controlled to finally reach Vdata+Vth, wherein Vdata represents a data signal voltage value and Vth represents the threshold voltage of the third transistor T3.

During a second reset period P3, the gate electrode scanning signal is at a non-active level, the second transistor T2 and the fourth transistor T4 are both turned off, a reset signal input by a second reset line RE2 (which can be selected as a first reset line coupled to an adjacent next row sub-pixel driving circuit) is at an active level, the seventh transistor T7 is controlled to be turned on, an initialization signal input by the second initialization signal line Vinit2 is input to the anode of the light-emitting element LD, and the light-emitting element LD is controlled not to emit light.

During the light-emitting time period P4, the light-emitting control signal written by the light-emitting control line EM is at an effective level, and the fifth transistor T5 and the sixth transistor T6 are controlled to conduct so that the power supply signal transmitted by the power supply line VDD is input to the first electrode of the third transistor T3; at the same time, since the gate electrode of the third transistor T3 is maintained at Vdata+Vth, the third transistor T3 is conducted; the gate-source voltage corresponding to the third transistor T3 is Vdata+Vth−Vdd, wherein Vdd is a voltage value corresponding to the power supply signal; the leakage current generated based on the gate-source voltage flows to the anode of the corresponding light-emitting element LD to drive the corresponding light-emitting element LD to emit light.

Figure 16:
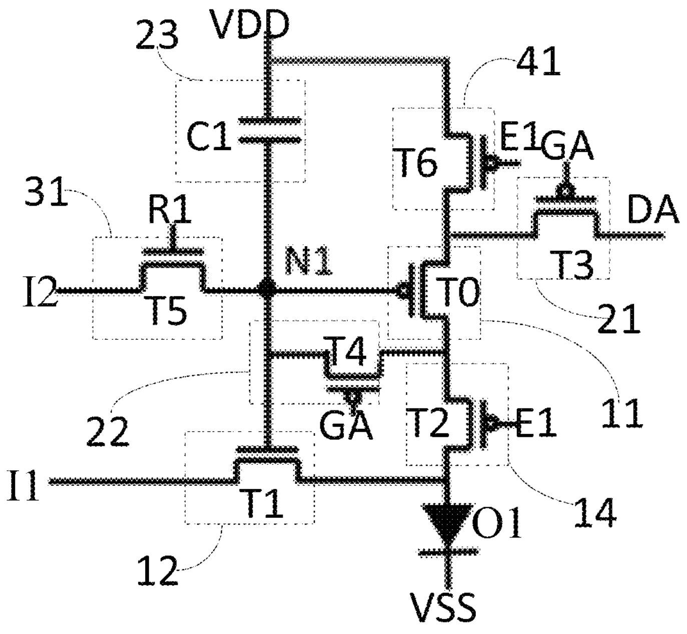
FIG. 16 is a schematic circuit diagram of a sub-pixel driving circuit in an LTPO mode in a display substrate provided by an embodiment of the present disclosure.

As shown in FIG. 16, the sub-pixel driving circuit adopts the LTPO mode.

As shown in FIG. 16, the sub-pixel driving circuit comprises a first transistor T1, an organic light-emitting diode O1, a driving transistor T0, a second transistor T2, a third transistor T3, a fourth transistor T4, a first capacitor C1, a fifth transistor T5 and a sixth transistor T6;

a gate electrode of the first transistor T1 is electrically connected to the first node N1, the source electrode of the first transistor T1 is electrically connected to the first initial voltage line, and the drain electrode of the first transistor T1 is electrically connected to the anode of the organic light-emitting diode O1;

the gate electrode of the driving transistor T0 is electrically connected to the first node N1;

the gate electrode of the second transistor T2 is electrically connected to the light-emitting control line E1, the source electrode of the second transistor T2 is electrically connected to the drain electrode of the driving transistor T0, and the drain electrode of the second transistor T0 is electrically connected to the anode of the organic light-emitting diode O1;

the gate electrode of the third transistor T3 is electrically connected to the scanning line GA, the source electrode of the third transistor T3 is electrically connected to the data line DA, and the drain electrode of the third transistor T3 is electrically connected to the source electrode of the drive transistor T0;

the gate electrode of the fourth transistor T4 is electrically connected to the scanning line GA, the source electrode of the fourth transistor T4 is electrically connected to the gate electrode of the drive transistor T0, and the drain electrode of the fourth transistor T4 is electrically connected to the drain electrode of the drive transistor T0;

a first plate of the first capacitor C1 is electrically connected to a gate electrode of the driving transistor T0, and a second plate of the first capacitor C1 is electrically connected to a high voltage line VDD;

the gate electrode of the fifth transistor T5 is electrically connected to the reset control line R1, the source electrode of the fifth transistor T5 is electrically connected to the second initial voltage line, and the drain electrode of the fifth transistor T5 is electrically connected to the gate electrode of the drive transistor T0;

the gate electrode of the sixth transistor T6 is electrically connected to the light-emitting control line E1, the source electrode of the sixth transistor T6 is electrically connected to the high voltage line VDD, and the drain electrode of the sixth transistor T6 is electrically connected to the source electrode of the driving transistor T0; the cathode of the organic light emitting diode O1 is electrically connected to a low voltage line VSS.

In at least one embodiment, T1 and T5 are N-type transistors and T2, T3, T4, T6 and T0 are P-type transistors.

In at least one embodiment, T1 and T5 may both be oxide transistors, and T2, T3, T4, T6 and T0 may all be LTPS transistors, in which case the pixel circuit shown in FIG. 16 is a LTPO circuit.

Figure 18:
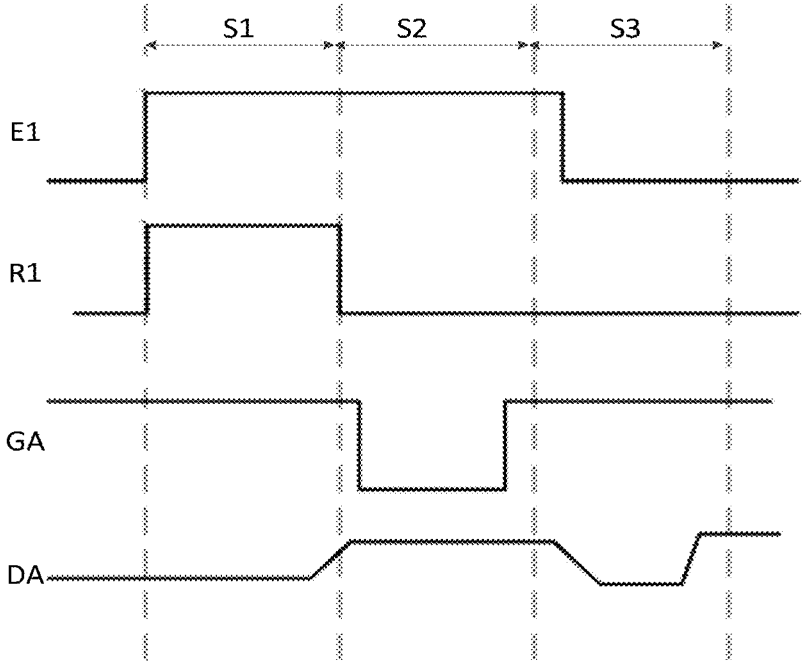
FIG. 18 is a driving timing diagram of an LTPO mode in a touch substrate according to an embodiment of the present disclosure.

As shown in FIG. 18, in operation of at least one embodiment of the pixel circuit shown in FIG. 16 of the present invention, a display cycle may comprise an initialization stage S1, a data writing stage S2 and a display stage S3 which are arranged successively;

In an initialization stage S1, E1 provides a high voltage signal, R1 provides a high voltage signal, GA provides a high voltage signal, T5 opens to initialize the potential of the first node N1, and I2 provides a −5V voltage signal to the first node N1; if the previous frame of picture is a black picture, there is no need to initialize the anode of O1 in the data writing stage S2; if the previous frame of picture is in a light state, and the current frame of picture is a black picture, then controlling T1 to be turned on in a data writing stage S2;

In the data writing stage S2, E1 provides a high voltage signal, R1 provides a low voltage signal, GA provides a low voltage signal, VDD provides a 1V voltage signal, T4 is turned on, and the DA provides a data voltage Vdata; when the current frame picture is not a black picture, the voltage of the Vdata is greater than or equal to −2V and less than or equal to 1V, and the threshold voltage of T0 is −2.5V, then at the beginning of the data writing stage S2, T0 is turned on, and C1 is charged via the Vdata so as to raise the potential of N1 until the potential of N1 becomes Vdata+Vth; at this time, the potential of N1 is greater than or equal to −4.5V and less than or equal to −1.5V, and T1 remains in a closed state;

In a data writing stage S2, E1 provides a high voltage signal, R1 provides a low voltage signal, and GA provides a low voltage signal; when a current frame picture is a black picture, a voltage value of Vdata is 4V, so that the potential of N1 is maintained at 1.5V, and I1 provides a −1V voltage signal, and at the same time, VDD is adjusted to output a 1V voltage signal, so that T0 can work in a cut-off area; under a black picture, T1 is in a normally open state;

In a display stage S3, E1 provides a low voltage signal, R1 provides a low voltage signal, and GA provides a high voltage signal; when a current frame picture is not a black picture, T2 and T6 are turned on, T0 drives O1 to emit light, and the driving current for T0 to drive O1 to emit light is K (Vdata−Vdd) 2, wherein K is a current coefficient of T0, and Vdd is a voltage value of the high voltage signal provided by the VDD;

In the display stage S3, E1 provides a low voltage signal, R1 provides a low voltage signal, GA provides a high voltage signal, and when the current frame picture is a black picture, T1 is in a normally-on state, T0 is in an off state, and I1 provides a −1V voltage signal, and at this time, the anode potential of O1 is always maintained at −1V. In addition, the disclosed embodiments also provide a touch display device including the touch substrate provided by the disclosed embodiments.

The following points need to be explained:

(1) The drawings relate only to the structures to which the embodiments of the present disclosure relate, and other structures may refer to general designs.

(2) In the drawings used to describe embodiments of the present disclosure, the thickness of layers or areas is exaggerated or reduced for clarity, i.e. the drawings are not to scale. It will be understood that when an element such as a layer, film, area or substrate is referred to as being "on" or "under" another element, it can be "directly on" or "directly under" the other element or intervening elements may be present.

(3) Without conflict, embodiments of the present disclosure and features of the embodiments may be combined with each other to provide new embodiments.

The foregoing is directed to particular embodiments of the present disclosure, but the scope of the disclosure is not limited thereto, and the scope of the disclosure is defined by the appended claims.

What is claimed is:

1. A touch layer, a touch pattern of the touch layer comprising:

at least one first electrode chain and at least one second electrode chain, wherein the first electrode chain comprises at least two first electrodes arranged along a first direction and connected with each other, and the second electrode chain comprises at least two second electrodes arranged along a second direction crossing the first direction and connected in sequence, the first electrode chain and the second electrode chain being insulated with each other and cross each other to form at least one crossing point; wherein at least one side edge of the first electrode is provided with a plurality of first fingers protruding outwards, at least one side edge of the second electrode is provided with a plurality of second fingers protruding outwards, and the plurality of first fingers and the plurality of second fingers are mutually embedded;

wherein:

in at least one side edge of the first electrode, at least one first finger has a smaller extension length than at least one other first finger and is closer to the crossing point; and/or in at least one side edge of the second electrode, at least one second finger has a smaller extension length than at least one other second finger and is closer to the crossing point;

wherein the touch layer is comprised in a touch substrate;

the touch substrate comprises a central area and a peripheral area located at the periphery of the central area, at least one side of the peripheral area is a binding side, a driving circuit is provided at the binding side, the touch layer comprises a plurality of touch electrodes and a plurality of touch signal lines, wherein at least one touch signal line comprises:

a main line led out from the driving circuit and extending to the central area via the binding side in a third direction, the third direction being a direction from the binding side to an opposite side of the binding side; and, at least one branch line connected to one end of the main line away from the driving circuit and extending along at least part of the outer contour of the pattern of the touch electrode connected to the touch signal line and connected to the touch electrode;

wherein the main line is divided into multiple groups, and each group of the main line comprises one first main line and a plurality of second main lines;

a touch signal line corresponding to the first main line comprises two branch lines extending away from each other, and each of the plurality of second main lines comprises only one single branch line extending in one direction;

in each group of the main line, the first main line has a longest extension length along the third direction;

in each group of the main line, the farther a second main line is from the first main line, the shorter an extension length of the second main line along the third direction is, and the longer an extension length of a branch line of a touch signal line corresponding to the second main line along the outer contour of the pattern of the corresponding touch electrode is.

2. The touch layer according to claim 1, wherein in at least one side edge of the first electrode, the first finger has an extension length in a contour extension direction of the side edge that gradually increases from opposite ends of the side edge toward the middle; and/or in at least one side edge of the second electrode, the second finger has an extension length in a contour extension direction of the side edge that gradually increases from opposite ends of the side edge toward the middle.

3. The touch layer according to claim 1, wherein one second finger is embedded in a first gap between two adjacent first fingers, and the first gap has a same pattern as the second finger embedded in the first gap; and/or one first finger is embedded in a second gap between two adjacent second fingers, and the second gap has a same pattern as the first finger embedded in the second gap.

4. The touch layer according to claim 1, wherein the patterns of at least one group of two first electrodes adjacent in the first direction are in rotational symmetry, with a crossing point formed by the two adjacent first electrodes and the second electrodes as a rotation center; and/or the patterns of at least one group of two second electrodes adjacent in the second direction are in rotational symmetry, with a crossing point formed by the two adjacent second electrodes and the first electrodes as a rotation center.

5. The touch layer according to claim 1, wherein the pattern of the first electrode is in mirror symmetry about a mirror axis along the first direction and passing through a crossing point of the first electrode and the second electrode; and/or the pattern of the second electrode is in mirror symmetric about a mirror axis along the second direction and passing through a crossing point of the second electrode and the first electrode.

6. The touch layer according to claim 1, wherein the extension lengths of a plurality of first fingers on the same side edge of the first electrode are different; the extension lengths of a plurality of second fingers on the same side edge of the second electrode are different.

7. The touch layer according to claim 1, wherein a plurality of first projections and a plurality of first recesses are provided on at least one side edge of the first electrode, the plurality of first projections and the plurality of first recesses are staggered in sequence, and the first projections and the first recesses adjacent thereto are fitted to form the first finger; a plurality of second projections and a plurality of second recesses are provided on at least one side edge of the second electrode, the plurality of second projections and the plurality of second recesses are staggered in sequence, and the second projections and the second recesses adjacent thereto are fitted to form the second finger.

8. The touch layer according to claim 1, wherein the first electrode comprises at least a first side edge and a second side edge adjacent to each other, the pattern of the plurality of first projections on the first side edge is the same as the pattern of the plurality of first recesses on the second side edge, and the pattern of the plurality of first recesses on the first side edge is the same as the pattern of the plurality of first projections on the second side edge; the second electrode includes at least a third side edge and a fourth side edge adjacent to each other, the pattern of the plurality of second projections on the third side edge is the same as the pattern of the plurality of second recesses on the fourth side edge, and the pattern of the plurality of second recesses on the third side edge is the same as the pattern of the plurality of second projections on the fourth side edge.

9. The touch layer according to claim 1, wherein a plurality of first fingers on the edge of any one of the first electrodes are sequentially ordered from one end to the other end along the contour extension direction of the side edge, and the extension lengths of the first fingers with the same sequence number of the first electrodes on different edges are the same; and/or a plurality of second fingers on the edge of any one of the second electrodes are sequentially ordered from one end to the other end along the contour extension direction of the side edge, and the extension lengths of the second fingers of the same sequence number on different edges are the same.

10. The touch layer according to claim 1, wherein the first electrode and the second electrode are both made of a metal mesh, and the first electrode is arranged to cross the second electrode by a breakpoint of the metal mesh and insulated from the second electrode.

11. The touch layer according to claim 1, wherein the first electrode chain further comprises at least one first connecting bridge connecting two adjacent first electrodes, and the second electrode chain further comprises at least one second connecting bridge connecting two adjacent second electrodes; wherein the second connecting bridge and the first electrode, the second electrode are the same metal layer, and the second connecting bridge and the first connecting bridge are different metal layers.

12. The touch layer according to claim 1, wherein an included angle is formed by an extension direction of the first finger and the contour extension direction of the side edge where the first finger is located; and/or an included angle is formed by the extension direction of the second finger and the contour extension direction of the side edge where the second finger is located.

13. A touch substrate, comprising: a substrate and a touch layer, a touch pattern of the touch layer comprising:

at least one first electrode chain; and at least one second electrode chain, wherein the first electrode chain comprises at least two first electrodes arranged along a first direction and connected with each other, and the second electrode chain comprises at least two second electrodes arranged along a second direction crossing the first direction and connected in sequence, the first electrode chain and the second electrode chain being insulated with each other and cross each other to form at least one crossing point, wherein at least one side edge of the first electrode is provided with a plurality of first fingers protruding outwards, at least one side edge of the second electrode is provided with a plurality of second fingers protruding outwards, and the plurality of first fingers and the plurality of second fingers are mutually embedded, and wherein:

in at least one side edge of the first electrode, at least one first finger has a smaller extension length than at least one other first finger and is closer to the crossing point; and/or in at least one side edge of the second electrode, at least one second finger has a smaller extension length than at least one other second finger and is closer to the crossing point;

wherein the touch substrate comprises a central area and a peripheral area located at the periphery of the central area, at least one side of the peripheral area is a binding side, a driving circuit is provided at the binding side, the touch layer comprises a plurality of touch electrodes and a plurality of touch signal lines, wherein at least one touch signal line comprises:

a main line led out from the driving circuit and extending to the central area via the binding side in a third direction, the third direction being a direction from the binding side to an opposite side of the binding side; and, at least one branch line connected to one end of the main line away from the driving circuit and extending along at least part of the outer contour of the pattern of the touch electrode connected to the touch signal line and connected to the touch electrode;

wherein the main line is divided into multiple groups, and each group of the main line comprises one first main line and a plurality of second main lines;

a touch signal line corresponding to the first main line comprises two branch lines extending away from each other, and each of the plurality of second main lines comprises only one single branch line extending in one direction;

in each group of the main line, the first main line has a longest extension length along the third direction;

in each group of the main line, the farther a second main line is from the first main line, the shorter an extension length of the second main line along the third direction is, and the longer an extension length of a branch line of a touch signal line corresponding to the second main line along the outer contour of the pattern of the corresponding touch electrode is.

14. The touch substrate according to claim 13, wherein the touch electrodes comprise at least one first electrode and at least one second electrode, and each of the touch signal lines is connected between a corresponding touch electrode and the driving circuit.

15. The touch substrate according to claim 13, wherein a connection position of the branch line and the main line is at an intermediate position of the branch line in the direction extending along the outer contour of the pattern of the touch electrode, so that the branch line is divided into a first branch section and a second branch section extending away from each other by the connection position.

16. The touch substrate according to claim 13, wherein at least part of the main line is in a non-wound straight line shape at least at a part in the peripheral area and a part extending from the peripheral area into the central area;

at least another part of the main line comprises:

a first line segment, one end of the first line segment being connected to the driving circuit, and the other end extending in a straight line along the third direction toward the central area;

a second line segment, one end of the second line segment being connected to an end of the first line segment facing away from the driving circuit, the other end extending a predetermined distance along an outer contour of the central area; and a third line segment connected at one end to an end of the second line segment facing away from the second line segment and at the other end to the branch line.

17. The touch substrate according to claim 13, wherein the branch line is closely attached to at least part of the outer contour of the pattern of the corresponding touch electrode so as to be directly connected to at least part of the outer contour of the pattern of the touch electrode as one body.

18. The touch substrate according to claim 13, wherein the extension length of the main line of the plurality of the touch signal lines along the third direction is different, and the longer the extension length of the main line of the plurality of the touch signal lines along the third direction is, the shorter the extension length of the branch line along the outer contour of the pattern of the corresponding the touch electrode is.

19. The touch substrate according to claim 18, wherein along the third direction, a plurality of the touch electrodes are divided into N rows, and the first row of touch electrodes is closer to the binding side than the Nth row of touch electrodes, and wherein from the first row of touch electrodes to the Nth row of touch electrodes, the extension length of the main line in the third direction gradually increases, and the extension length of the branch line along at least part of the outer contour of the pattern of the corresponding touch electrode gradually decreases.

20. A touch display device comprising a touch substrate, wherein the touch substrate comprises a substrate and a touch layer, a touch pattern of the touch layer comprising:

at least one first electrode chain; and at least one second electrode chain, wherein the first electrode chain comprises at least two first electrodes arranged along a first direction and connected with each other, and the second electrode chain comprises at least two second electrodes arranged along a second direction crossing the first direction and connected in sequence, the first electrode chain and the second electrode chain being insulated with each other and cross each other to form at least one crossing point, wherein at least one side edge of the first electrode is provided with a plurality of first fingers protruding outwards, at least one side edge of the second electrode is provided with a plurality of second fingers protruding outwards, and the plurality of first fingers and the plurality of second fingers are mutually embedded, and wherein:

in at least one side edge of the first electrode, at least one first finger has a smaller extension length than at least one other first finger and is closer to the crossing point; and/or in at least one side edge of the second electrode, at least one second finger has a smaller extension length than at least one other second finger and is closer to the crossing point;

wherein the touch substrate comprises a central area and a peripheral area located at the periphery of the central area, at least one side of the peripheral area is a binding side, a driving circuit is provided at the binding side, the touch layer comprises a plurality of touch electrodes and a plurality of touch signal lines, wherein at least one touch signal line comprises:

a main line led out from the driving circuit and extending to the central area via the binding side in a third direction, the third direction being a direction from the binding side to an opposite side of the binding side; and, at least one branch line connected to one end of the main line away from the driving circuit and extending along at least part of the outer contour of the pattern of the touch electrode connected to the touch signal line and connected to the touch electrode;

wherein the main line is divided into multiple groups, and each group of the main line comprises one first main line and a plurality of second main lines;

a touch signal line corresponding to the first main line comprises two branch lines extending away from each other, and each of the plurality of second main lines comprises only one single branch line extending in one direction;

in each group of the main line, the first main line has a longest extension length along the third direction;

in each group of the main line, the farther a second main line is from the first main line, the shorter an extension length of the second main line along the third direction is, and the longer an extension length of a branch line of a touch signal line corresponding to the second main line along the outer contour of the pattern of the corresponding touch electrode is.

* * * * *